(12) United States Patent
Nagata et al.

(10) Patent No.: US 11,243,534 B2
(45) Date of Patent: Feb. 8, 2022

(54) INFORMATION PROCESSING DEVICE, INFORMATION PROCESSING METHOD, AND NON-TRANSITORY COMPUTER READABLE MEDIUM

(71) Applicant: PIONEER CORPORATION, Tokyo (JP)

(72) Inventors: Hiroshi Nagata, Kawagoe (JP); Makoto Kurahashi, Kawagoe (JP); Akira Gotoda, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 167 days.

(21) Appl. No.: 16/482,645

(22) PCT Filed: Jan. 31, 2018

(86) PCT No.: PCT/JP2018/003111
§ 371 (c)(1),
(2) Date: Jul. 31, 2019

(87) PCT Pub. No.: WO2018/143238
PCT Pub. Date: Aug. 9, 2018

(65) Prior Publication Data
US 2020/0012279 A1 Jan. 9, 2020

(30) Foreign Application Priority Data
Jan. 31, 2017 (JP) .............................. JP2017-016008

(51) Int. Cl.
*G05D 1/00* (2006.01)
*G01C 21/34* (2006.01)
(Continued)

(52) U.S. Cl.
CPC ....... *G05D 1/0088* (2013.01); *G01C 21/3446* (2013.01); *G01C 21/3667* (2013.01);
(Continued)

(58) Field of Classification Search
CPC ......... G05D 1/0088; G05D 2201/0213; G01C 21/3446; G01C 21/3667; G01C 21/3461;
(Continued)

(56) References Cited

U.S. PATENT DOCUMENTS

| 9,903,725 B2 | 2/2018 | Sato et al. |
| 10,126,743 B2 | 11/2018 | Fukumoto |

(Continued)

FOREIGN PATENT DOCUMENTS

| JP | 2016-133328 A | 7/2016 |
| WO | 2014-139821 A1 | 9/2014 |

(Continued)

OTHER PUBLICATIONS

European Search Report corresponding to European Application No. EP18747612.2, dated Feb. 16, 2021 (10 pages).
(Continued)

*Primary Examiner* — Rodney A Butler
(74) *Attorney, Agent, or Firm* — Procopio, Cory, Hargreaves & Savitch LLP

(57) ABSTRACT

An information processing device (20) includes a route acquisition unit (202) and an automatic driving section determination unit (204). The route acquisition unit (202) acquires route information indicating a moving route of a mobile body. The automatic driving section determination unit (204) acquires adaptation coefficients for a plurality of sections included in the moving route indicated by the route information, with reference to an adaptation coefficient storage unit (206) that stores automatic driving adaptation coefficients set for the respective sections. Further, the automatic driving section determination unit (204) determines the automatic driving sections of the mobile body in the moving route, based on the acquired adaptation coefficients.

14 Claims, 21 Drawing Sheets

(51) Int. Cl.
*G01C 21/36* (2006.01)
*G08G 1/09* (2006.01)
*G08G 1/0968* (2006.01)
*G08G 1/0969* (2006.01)

(52) U.S. Cl.
CPC ..... *G08G 1/0969* (2013.01); *G08G 1/096844* (2013.01); *G05D 2201/0213* (2013.01)

(58) Field of Classification Search
CPC ......... G01C 21/3453; G08G 1/096844; G08G 1/0969; B60W 2556/20; B60W 60/0015; B60W 60/0053; B60W 2556/10; B60W 2050/0083; B60W 2556/50; B60W 2555/20; B60W 2050/0089
See application file for complete search history.

(56) References Cited

U.S. PATENT DOCUMENTS

| | | | |
|---|---|---|---|
| 10,520,324 B2 | 12/2019 | Iwai et al. | |
| 2002/0128752 A1* | 9/2002 | Joshi | G01C 21/32 701/1 |
| 2016/0305787 A1* | 10/2016 | Sato | G05D 1/0088 |
| 2017/0010613 A1* | 1/2017 | Fukumoto | G01C 21/3492 |
| 2017/0219364 A1 | 8/2017 | Lathrop et al. | |
| 2017/0227971 A1 | 8/2017 | Shimotani et al. | |
| 2018/0023966 A1 | 1/2018 | Iwai et al. | |
| 2018/0038701 A1 | 2/2018 | Iwai et al. | |
| 2018/0113460 A1 | 4/2018 | Koda et al. | |

FOREIGN PATENT DOCUMENTS

| | | |
|---|---|---|
| WO | 2015-111507 A1 | 7/2015 |
| WO | 2015-129366 A1 | 9/2015 |
| WO | 2016035199 A1 | 3/2016 |
| WO | 2016-152873 A1 | 9/2016 |
| WO | 2016139748 A1 | 9/2016 |

OTHER PUBLICATIONS

International Search Report for related International Application No. PCT/JP2018/003111, dated Mar. 27, 2018; 2 pages.

* cited by examiner

204

| SECTION | AUTOMATIC DRIVING PROPRIETY | ADAPTATION COEFFICIENT |
|---|---|---|
| S1 | IMPOSSIBLE | — |
| S2 | POSSIBLE | 50 |
| S3 | POSSIBLE | 50 |
| S4 | POSSIBLE | 60 |
| S5 | POSSIBLE | 60 |
| S6 | POSSIBLE | 40 |
| S7 | POSSIBLE | 80 |
| S8 | POSSIBLE | 30 |
| S9 | POSSIBLE | 80 |
| S10 | POSSIBLE | 60 |
| S11 | IMPOSSIBLE | — |

| CALCULATION ELEMENT TYPE | POSITION INFORMATION | TIME INFORMATION | WEATHER INFORMATION | VEHICLE TYPE INFORMATION | SENSOR INFORMATION |
|---|---|---|---|---|---|
| OVERRIDE | $(x_1, y_1)$ | $T_1$ | $W_1$ | $M_1$ | $S_1$ |
| COMMUNICATION | $(x_2, y_2)$ | $T_2$ | $W_2$ | $M_2$ | $S_2$ |
| TRANSFER OF AUTHORITY | $(x_3, y_3)$ | $T_3$ | $W_3$ | $M_3$ | $S_3$ |
| DECREASE IN POSITION ESTIMATION ACCURACY | $(x_4, y_4)$ | $T_4$ | $W_4$ | $M_4$ | $S_4$ |
| ... | ... | ... | ... | ... | ... |

INFORMATION PROCESSING DEVICE, INFORMATION PROCESSING METHOD, AND NON-TRANSITORY COMPUTER READABLE MEDIUM

CROSS-REFERENCE TO RELATED APPLICATIONS

This application is a U.S. National Stage entry of PCT Application No: PCT/JP2018/003111 filed Jan. 31, 2018, which claims priority to Japanese Patent Application No. 2017-016008, filed Jan. 31, 2017, the contents of which are incorporated herein by reference.

TECHNICAL FIELD

The present invention relates to an information processing device, an information processing method, and a program.

BACKGROUND ART

Vehicles mounted with an automatic driving function are becoming familiar, and various techniques related to automatic driving of the vehicle have been developed. For example, according to Patent Document 1 below, a technique is disclosed that calculates a sum of the cost according to whether a section included in a searched route is an automatic driving section or a non-automatic driving section and the cost according to whether a next section is an automatic driving section or a non-automatic driving section in a certain section, and uses the sum as an index for determination as to the searched route.

RELATED DOCUMENT

Patent Document

[Patent Document 1] Japanese Unexamined Patent Publication No. 2016-133328

SUMMARY OF THE INVENTION

Technical Problem

Various factors such as the effects of thunderstorm, fog, or west sun in the traveling section, or the characteristics of a vehicle such as the width of the host vehicle or the performance of the sensors mounted on the host vehicle can affect whether or not stable automatic driving is possible in the traveling section. In other words, on an actual road, automatic driving is not always possible in a section where automatic driving is possible. In the technique described in Patent Document 1, only the cost according to the automatic driving section and the non-automatic driving section included in the searched route is calculated, and it is not possible to determine the automatic driving section in consideration of such factors. Therefore, for example, the automatic driving function may not be used effective by, for example, selecting a route that frequently includes a section where it is originally an automatic driving section, but actually the driver needs to drive manually.

The present invention has been made in view of the above-described problems, and an object thereof is to provide a technique capable of effectively utilizing an automatic driving function.

Solution to Problem

The invention described in claim 1 is an information processing device including:

a route acquisition unit that acquires route information indicating a moving route of a mobile body; and an automatic driving section determination unit that refers to an adaptation coefficient storage unit which stores an adaptation coefficient of automatic driving set for each section, and determines an automatic driving section of the mobile body in the moving route, based on the adaptation coefficients of a plurality of the sections included in the moving route indicated by the route information.

The invention described in claim 14 is an information processing method, executed by a computer, including:

a step of acquiring route information indicating a moving route of a mobile body; and a step of referring to an adaptation coefficient storage unit which stores an adaptation coefficient of automatic driving set for each section, and determining an automatic driving section of the mobile body in the moving route, based on the adaptation coefficients of a plurality of the sections included in the moving route indicated by the route information.

The invention described in claim 15 is a program causing a computer to function as:

a unit that acquires route information indicating a moving route of a mobile body; and a unit that refers to an adaptation coefficient storage unit which stores an adaptation coefficient of automatic driving set for each section, and determines an automatic driving section of the mobile body in the moving route, based on the adaptation coefficients of a plurality of the sections included in the moving route indicated by the route information.

BRIEF DESCRIPTION OF THE DRAWINGS

The foregoing and other objects, features and advantages will become more apparent from the following description of preferred example embodiments and the accompanying drawings.

FIG. 10 is a diagram showing an example of information stored by a calculation element storage unit.

DESCRIPTION OF EMBODIMENTS

Figure 1:
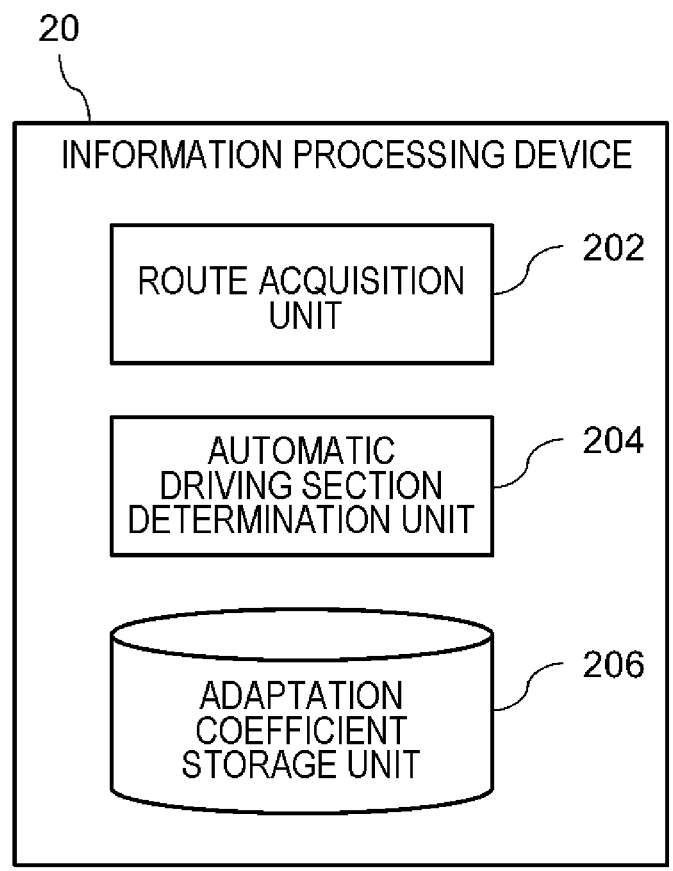
FIG. 1 is a block diagram conceptually showing a functional configuration in a first embodiment.

Hereinafter, embodiments of the present invention will be described with reference to the drawings. In all the drawings, the same constituent elements are denoted by the same reference numerals, and the description thereof will not be repeated as appropriate.

Unless otherwise specified, in block diagrams, each block represents a functional unit configuration, instead of a hardware unit configuration.

First Embodiment

[Functional Configuration]

FIG. 1 is a block diagram conceptually showing a functional configuration in a first embodiment. The information processing device 20 illustrated in FIG. 1 is, for example, a device mounted on a vehicle. Here, "mounted on a vehicle" includes not only being incorporated into the vehicle as a component of the vehicle but also installing a separately assembled unit inside or outside the vehicle. That is, the information processing device 20 may be, for example, a navigation device embedded in an instrument panel of a vehicle, or a portable terminal or computer carried by a driver and brought into the vehicle. Hereinafter, each processing unit of the information processing device 20 shown in FIG. 1 will be described.

As shown in FIG. 1, the information processing device 20 according to the present embodiment includes at least a route acquisition unit 202 and an automatic driving section determination unit 204. Further, in the example of FIG. 1, the information processing device 20 further includes an adaptation coefficient storage unit 206. Although described later, the adaptation coefficient storage unit 206 may be provided in an external device (not shown) communicably connected to the information processing device 20.

The route acquisition unit 202 acquires route information indicating a moving route of a mobile (for example, a vehicle). The route information is generated, for example, using a program implementing a route search algorithm such as Dijkstra's algorithm. The route acquisition unit 202 communicates with an external device installed with a program implementing a route search algorithm (for example, transmits position information on a departure place and a destination to the external device), and can acquire route information from the external device. Further, in a case where a program implementing a route search algorithm is installed in the information processing device 20, the route acquisition unit 202 can acquire the route from the program by giving position information on the departure place and the destination as the input information of the program.

The automatic driving section determination unit 204 refers to the adaptation coefficient storage unit 206 which stores the adaptation coefficient of automatic driving set for each section, and determines the automatic driving section of the host vehicle in the moving route, based on the adaptation coefficients of the plurality of sections, included in the moving route indicated by the route information acquired by the route acquisition unit 202.

Figures 2, 3:
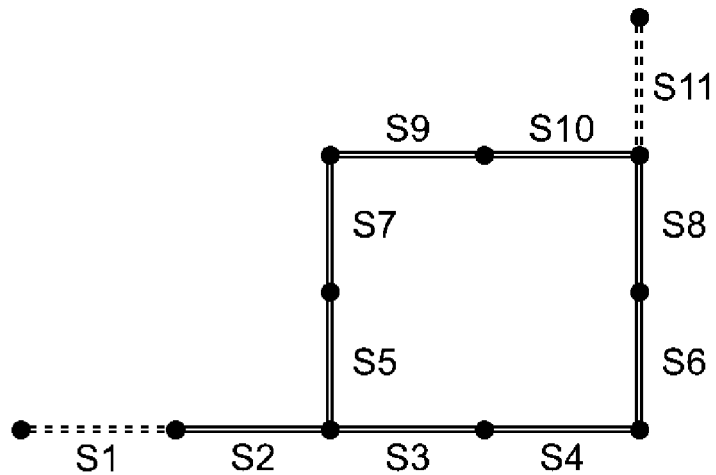
FIG. 2 is a diagram showing an example of a road configured with a plurality of sections.
FIG. 3 is a diagram showing an example of information stored by an adaptation coefficient storage unit.

Here, the operation of the automatic driving section determination unit 204 will be described on the assumption that there is a road having a shape as shown in FIG. 2, for example. FIG. 2 is a diagram showing an example of a road configured with a plurality of sections. In FIG. 2, black circles indicate the start point or the endpoint of the section. In addition, in FIG. 2, the sections of double solid lines (S2 to S10 in FIG. 2) indicate sections established by the country, local governments, or the like, for which automatic driving is permitted (hereinafter also referred to as "automatic drivable sections"). In addition, in FIG. 2, the sections of double dotted lines (S1, S11 in FIG. 2) indicate sections, other than the above-described automatic drivable sections, where the automatic driving is not permitted (hereinafter also referred to as "non-automatic driving section").

In this case, the adaptation coefficient storage unit 206 can store information as shown in FIG. 3. FIG. 3 is a diagram showing an example of information stored by the adaptation coefficient storage unit 206. As shown in FIG. 3, the adaptation coefficient storage unit 206 stores information indicating whether or not automatic driving is possible (information indicating "automatic drivable section" or "non-automatic driving section", stored in the column "automatic driving propriety" in FIG. 3), and automatic driving adaptation coefficient, as an index indicating whether or not stable automatic driving travel is possible in the section. In the example of FIG. 3, the higher the numerical value of the adaptation coefficient is, the more stable the automatic driving is possible. The contents shown in FIG. 3 are merely an example, and the present invention is not limited to this example. For example, the adaptation coefficient storage unit 206 may not store information indicating whether or not automatic driving is possible.

The automatic driving section determination unit 204 specifies a section included in the moving route, based on the moving route indicated by the route information acquired by the route acquisition unit 202, and can acquire the adaptation coefficient associated with the specified section. Here, for example, by setting in advance a reference threshold for determining whether stable automatic driving is possible, the automatic driving section determination unit 204 can determine a section in which the adaptation coefficient exceeds the reference threshold, as the automatic driving section of the host vehicle. Then, the automatic driving section determination unit 204 can generate information indicating the determined automatic driving section of the host vehicle.

As described above, in the present embodiment, it is possible to determine and control the automatic driving section of the host vehicle by using the route information indicating the moving route of the host vehicle and the adaptation coefficient for the automatic driving set for each section. This enables effective use of the automatic driving function.

Further, the automatic driving section of the host vehicle determined by the automatic driving section determination unit 204 can be used as an input of various processes. For example, information indicating the automatic driving section of the host vehicle in the automatic drivable section determined by the automatic driving section determination unit 204 can be output to a device having the navigation function. The device can display the route to the destination in the state where the automatic driving section of the host vehicle can be discriminated, by using information indicating the automatic driving section determined by the automatic driving section determination unit 204. Further, the device compares the position of the host vehicle estimated using the position estimation algorithm with the automatic driving section determined by the automatic driving section determination unit 204, and in a case where the position of the host vehicle approaches the start point or end point of the automatic driving section by a predetermined threshold or more, it becomes possible to output a message or the like. In addition, the automatic driving section determination unit 204 can output information indicating the automatic driving section of the host vehicle to an electronic control unit (ECU) including a processing unit that performs automatic driving control. In this case, the ECU compares the position of the host vehicle estimated using the position estimation algorithm with the automatic driving section determined by the automatic driving section determination unit 204, and controls the host vehicle so as to perform automatic driving while the host vehicle is in the automatic driving section, and the driver so as to perform manual driving in the other sections.

Hereinafter, a first embodiment will be described in more detail.

[Hardware Configuration]

Each functional configuration unit of the information processing device 20 may be realized by hardware (for example, a hard-wired electronic circuit) that realizes each functional configuration unit, or a combination of hardware and software (for example, a combination of an electronic circuit, a program for controlling the electronic circuit, and the like). Hereinafter, the case where each functional configuration unit of the information processing device 20 is realized by a combination of hardware and software will be further described.

Figure 4:
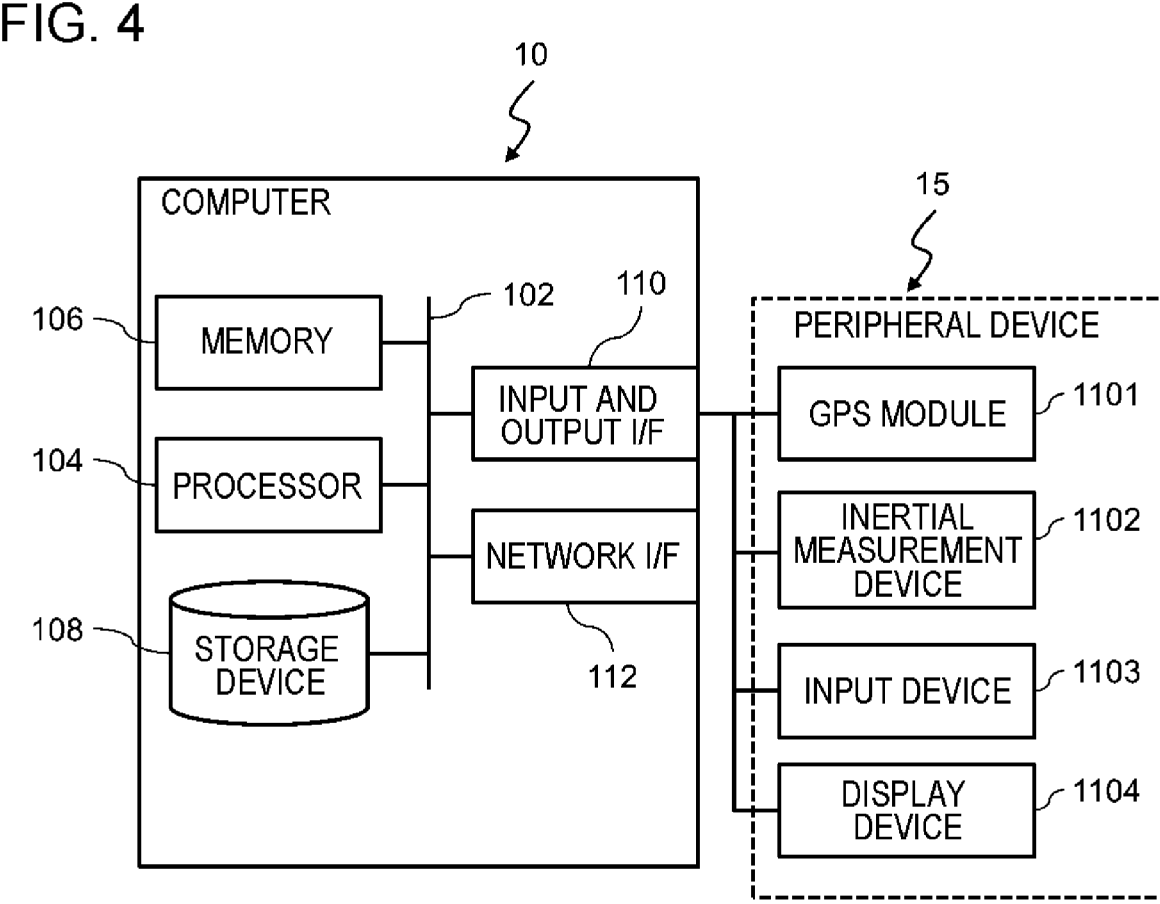
FIG. 4 is a diagram illustrating a hardware configuration of the information processing device.

FIG. 4 is a diagram illustrating a hardware configuration of the information processing device 20. The computer 10 is a computer that implements the information processing device 20. The computer 10 may be a computer specially designed to realize the information processing device 20, or may be a general-purpose computer.

The computer 10 includes a bus 102, a processor 104, a memory 106, a storage device 108, an input and output interface 110, and a network interface 112. The bus 102 is a data transmission path through which the processor 104, the memory 106, the storage device 108, the input and output interface 110, and the network interface 112 mutually transmit and receive data. However, a method of connecting the processor 104 and the like to each other is not limited to bus connection. The processor 104 is an arithmetic processing unit realized by using a microprocessor or the like. The memory 106 is a main storage device implemented by using a random access memory (RAM) or the like. The storage device 108 is an auxiliary storage device implemented by using a read only memory (ROM), a flash memory, or the like.

The input and output interface 110 is an interface for connecting the computer 10 to the peripheral device 15. For example, the input and output interface 110 is connected to a GPS module 1101 that receives GPS signals from satellites and generates GPS information, an inertial measurement device 1102 that generates information indicating angular velocity and acceleration of a vehicle, or the like. The inertial measurement device 1102 can generate information indicating the angular velocity and acceleration of the vehicle using, for example, a gyro sensor or the like. Further, the input and output interface 110 may further be connected to an input device 1103 that receives an input operation from a user, a display device 1104, or a touch panel in which they are integrated.

The network interface 112 is an interface for connecting the computer 10 to a communication network. This communication network is, for example, a wide area network (WAN) communication network. The method by which the network interface 112 connects to the communication network may be a wireless connection or a wired connection. For example, the computer 10 can communicate with an external device (for example, a server device or the like) through the network interface 112. In a case where the external server device includes the adaptation coefficient storage unit 206, the information processing device 20 can communicate with the server device through the network interface 112 to acquire the adaptation coefficient.

The storage device 108 stores program modules for realizing the functional components of the information processing device 20. The processor 104 implements the functions of the information processing device 20 by reading the program module into the memory 106 and executing the program module. The storage device 108 may further store, for example, information as shown in FIG. 3. In this case, the storage device 108 serves as the adaptation coefficient storage unit 206.

[Operation Example]

Figure 5:
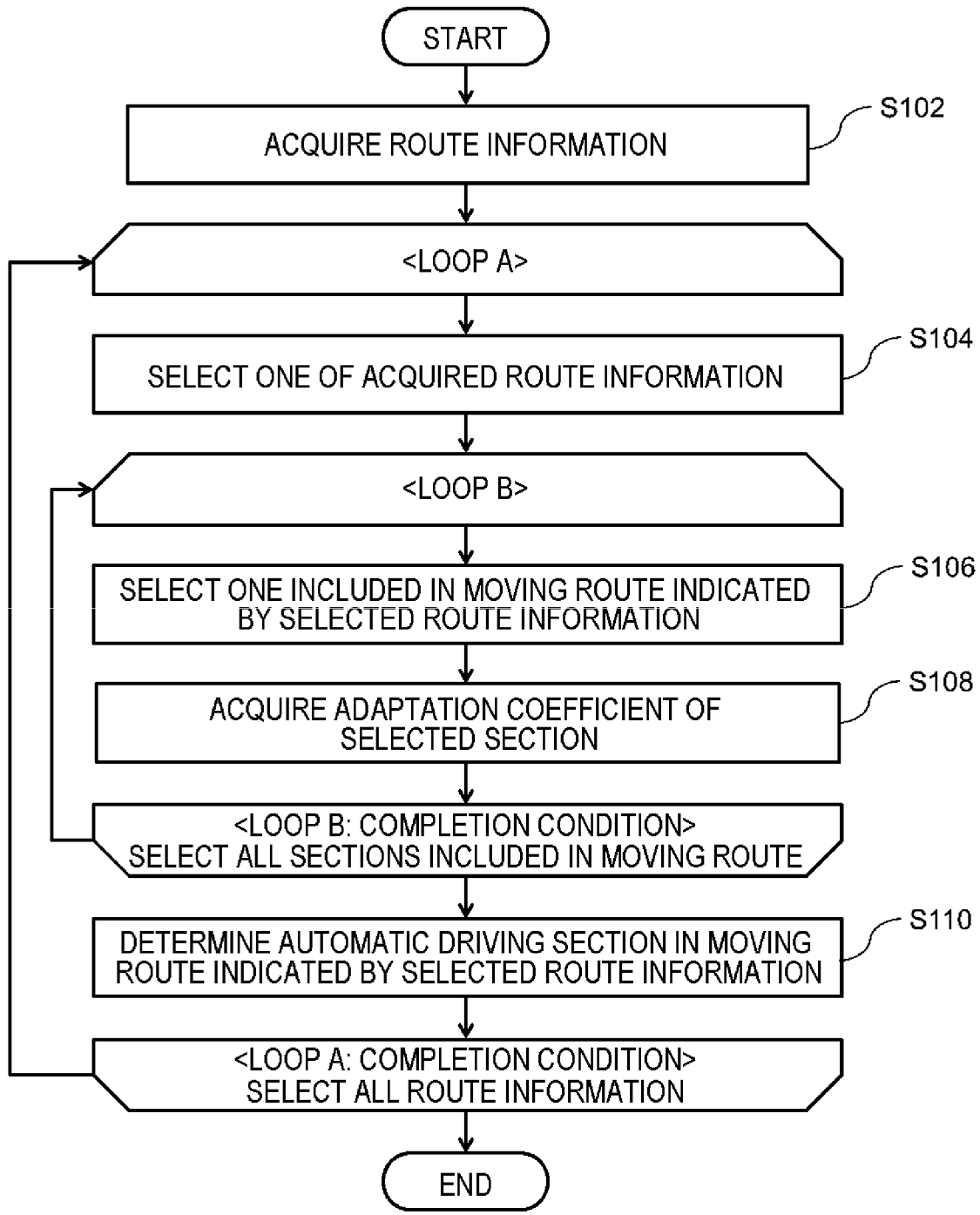
FIG. 5 is a flowchart illustrating the flow of a process in the first embodiment.

An example of the operation of the information processing device 20 of the present embodiment will be described, using FIG. 5. FIG. 5 is a flowchart illustrating the flow of a process in the first embodiment.

The route acquisition unit 202 acquires route information indicating a moving route connecting these two points, based on the position information of the departure place and the destination (S102). The route acquisition unit 202 acquires, for example, position information of the departure place and the destination through an input device (such as a touch panel) connected to the input and output interface 110. The route acquisition unit 202 may acquire position information of the departure place from the GPS module connected to the input and output interface 110. Further, the route acquisition unit 202 may acquire only the route information of the optimal moving route, or route information of each of a plurality of moving routes (for example, the upper predetermined number of moving routes obtained in the calculation of the optimal route).

Figure 6:
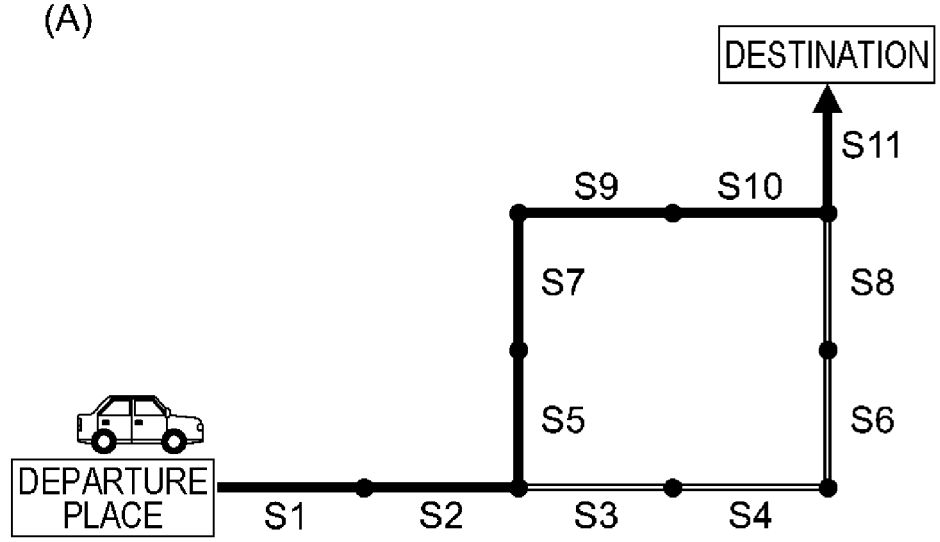
FIGS. 6(A) and 6(B) are diagrams illustrating a departure place and a destination of a vehicle, and a moving route of the vehicle.
Figure 6:
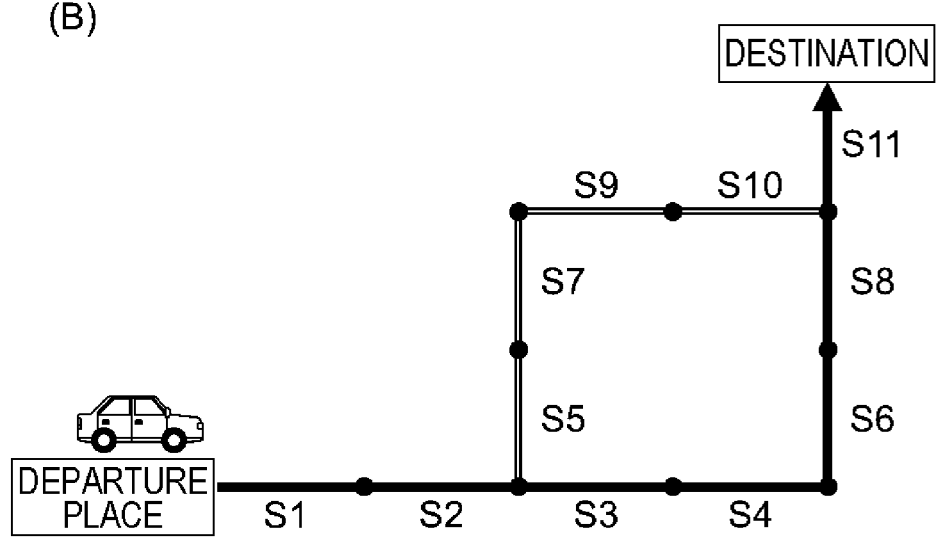

Here, in the road illustrated in FIG. 2, it is assumed that the left end of the section S1 is defined as the departure point, and the upper end of the section S11 is defined as the destination. In this case, routes (route A and route B) as shown in FIG. 6 are assumed as the moving route of the vehicle. FIG. 6 is a diagram illustrating a departure place and a destination of a vehicle, and a moving route of the vehicle. The route acquisition unit 202 can acquire at least one of route information indicating the route A and route information indicating the route B. In the following description, it is assumed that both of the route information indicating the route A and the route information indicating the route B are acquired.

The automatic driving section determination unit 204 selects one of the route information acquired by the route acquisition unit 202 in the process of S102 (S104). For example, the automatic driving section determination unit 204 can select any one of the route information indicating the route A and the route information indicating the route B.

Then, the automatic driving section determination unit 204 selects one section included in the moving route indicated by the route information selected in the process of S104 (S106). For example, in a case where the route information indicating the route A is selected in the process of S104, the automatic driving section determination unit 204 selects one of the sections (S1, S2, S5, S7, S9, S10, S11) included in the route A. Here, the automatic driving section determination unit 204 can arbitrarily select a section included in the moving route. For example, the automatic driving section determination unit 204 can select a section in order from a section closer to the departure place of the route information.

The automatic driving section determination unit 204 refers to the adaptation coefficient storage unit 206, and acquires the adaptation coefficient corresponding to the section selected in the process of S106 (S108). For example, when selecting the section S1 in the process of S106, the automatic driving section determination unit 204 refers to the adaptation coefficient storage unit 206 as shown in FIG. 3, and can acquire the adaptation coefficient corresponding to the section S1 (in this case, "-(no adaptation coefficient)"). Further, when selecting the section S2 in the process of S106, the automatic driving section determination unit 204 refers to the adaptation coefficient storage unit 206 as shown in FIG. 3, and can acquire the adaptation coefficient corresponding to the section S2 (in this case, "50").

The automatic driving section determination unit 204 repeats the above-described processes of S106 and S108 until all the sections included in the moving route indicated by the route information selected in S104 are selected.

After selecting all the sections included in the moving route indicated by the route information selected in S104, and acquiring the adaptation coefficients of all sections, the automatic driving section determination unit 204 determines the automatic driving section in the moving route indicated by the route information selected in S104 (S110). Hereinafter, the process of the automatic driving section determination unit 204 will be specifically described.

The automatic driving section determination unit 204, for example, can set a section having an adaptation coefficient equal to or more than a threshold as an automatic driving section of the host vehicle (a section for performing automatic driving). Here, it is assumed that the automatic driving section determination unit 204 determines a section having an adaptation coefficient of 35 or more as the automatic driving section of the host vehicle, and determines a section having an adaptation coefficient less than 35 (in the present example, a section of which the adaptation coefficient is not set is included) as the manual driving section of the host vehicle. Further, it is assumed that the automatic driving section determination unit 204 determines a section having an adaptation coefficient of 50 or more as a section in which stable automatic driving is possible, among the automatic driving sections of the host vehicle. Further, it is assumed that the automatic driving section determination unit 204 determines a section having an adaptation coefficient of 35 or more and less than 50 as a section in which automatic driving may be interrupted for some reason (hereinafter referred to as "quasi-automatic driving section"), among the automatic driving sections of the host vehicle. The specific numerical values listed here, and the names and numbers of the classifications of sections such as "automatic driving section", "quasi-automatic driving section", and "manual driving section" are merely examples, and the present invention is not limited to the examples given here.

In the route A, 50 or more adaptation coefficients are set in the sections S2, S5, S7, S9, and S10. The other sections (sections S1 and S11) are non-automatic driving sections, and no adaptation coefficient is set in these sections. Therefore, the automatic driving section determination unit 204 determines the sections S2, S5, S7, S9, and S10 as the "automatic driving sections". In addition, the automatic driving section determination unit 204 determines the section S1 and S11 as the "manual driving sections".

In the route B, 50 or more adaptation coefficients are set in the sections S2, S3, and S4. Further, an adaptation coefficient of 35 or more and less than 50 is set in the section S6. Further, an adaptation coefficient less than 35 is set in the section S8. The other sections (sections S1 and S11) are non-automatic driving sections, and no adaptation coefficient is set in these sections. Therefore, the automatic driving section determination unit 204 determines the sections S2, S3, and S4 as the "automatic driving sections". In addition, the automatic driving section determination unit 204 determines the section S6 as the "quasi-automatic driving section". The automatic driving section determination unit 204 determines the sections S1, S8, and S11 as the "manual driving sections".

The automatic driving section determination unit 204 repeats the above-described processes after S104 until all the route information acquired in S102 is selected.

First Modification Example

Figure 7:
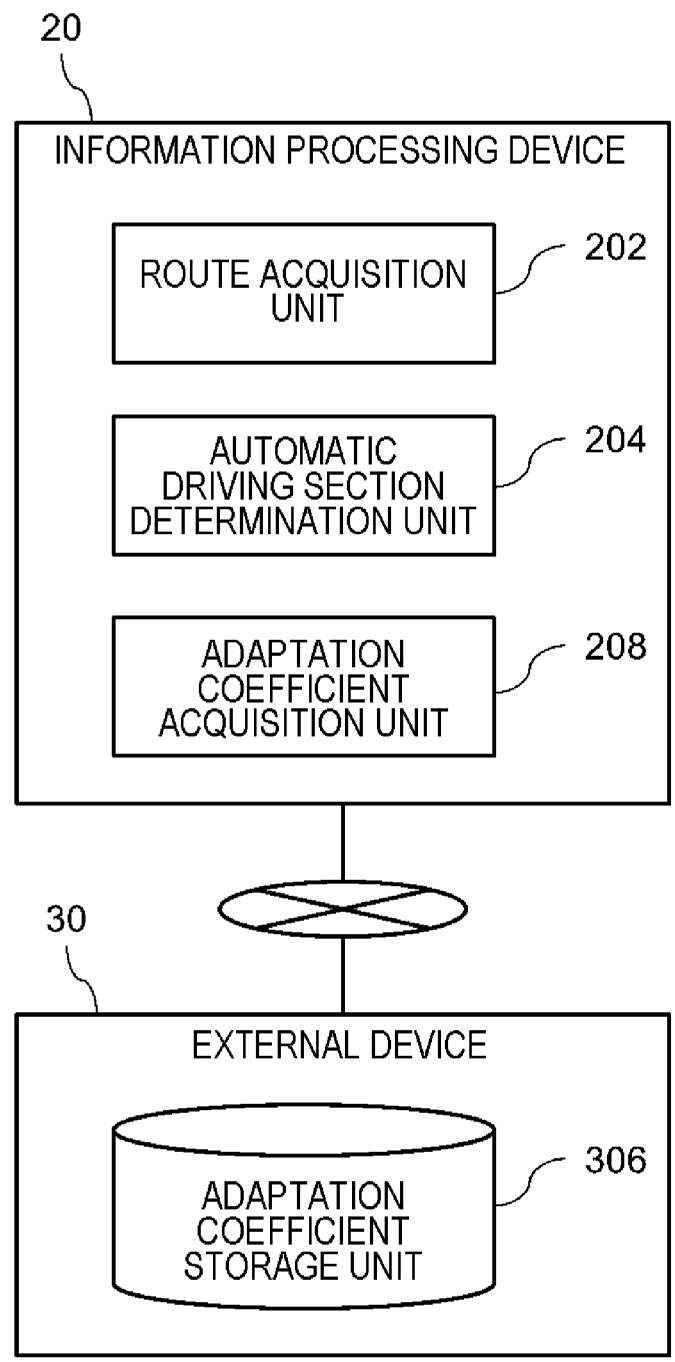
FIG. 7 is a block diagram conceptually showing a functional configuration of a first modification example in the first embodiment.

FIG. 1 shows an example in which the information processing device 20 includes the adaptation coefficient storage unit 206, a configuration as shown in FIG. 7 can also be considered. FIG. 7 is a block diagram conceptually showing a functional configuration of a first modification example in the first embodiment. In the example of FIG. 7, the information processing device 20 does not include the adaptation coefficient storage unit 206. Instead, an external device 30 includes the adaptation coefficient storage unit 306, and the information processing device 20 further includes the adaptation coefficient acquisition unit 208. The external device 30 is, for example, a dedicated server device or the like, and is communicably connected to the information processing device 20 through a network. The adaptation coefficient storage unit 306 of the external device 30 is the same as the adaptation coefficient storage unit 206 described above.

The adaptation coefficient acquisition unit 208 communicates with the external device 30 including the adaptation coefficient storage unit 306 through an external network of a vehicle such as a long term evolution (LTE) circuit or a 3G circuit, and acquires the adaptation coefficient. In this case, the destination information (for example, an internet protocol (IP) address or the like) of the external device 30 is registered in advance in a storage area such as the memory 106 or the storage device 108 of the information processing device 20, for example. The adaptation coefficient acquisition unit 208 communicates with the external device 30 using the destination information stored in the storage area, and transmits route information to the external device 30.

The external device 30 reads out the adaptation coefficient of each section included in the moving route indicated by the route information from the adaptation coefficient storage unit 306, based on the route information received from the information processing device 20. Then, the external device 30 transmits the read adaptation coefficient of each section to the information processing device 20.

Thus, the adaptation coefficient acquisition unit 208 can acquire the adaptation coefficient of each section included in the route information from the external device 30. In this modification example, it is also possible to obtain the effect of the first embodiment.

In the present modification example, the adaptation coefficient acquisition unit 208 may be configured to copy the information stored in the adaptation coefficient storage unit 306 of the external device 30 to the storage area (memory 106 or storage device 108) of the information processing device 20. In this case, the adaptation coefficient acquisition unit 208 can receive information from the adaptation coefficient storage unit 306 provided in the external device 30 by push communication or pull communication.

Second Modification Example

Figure 8:
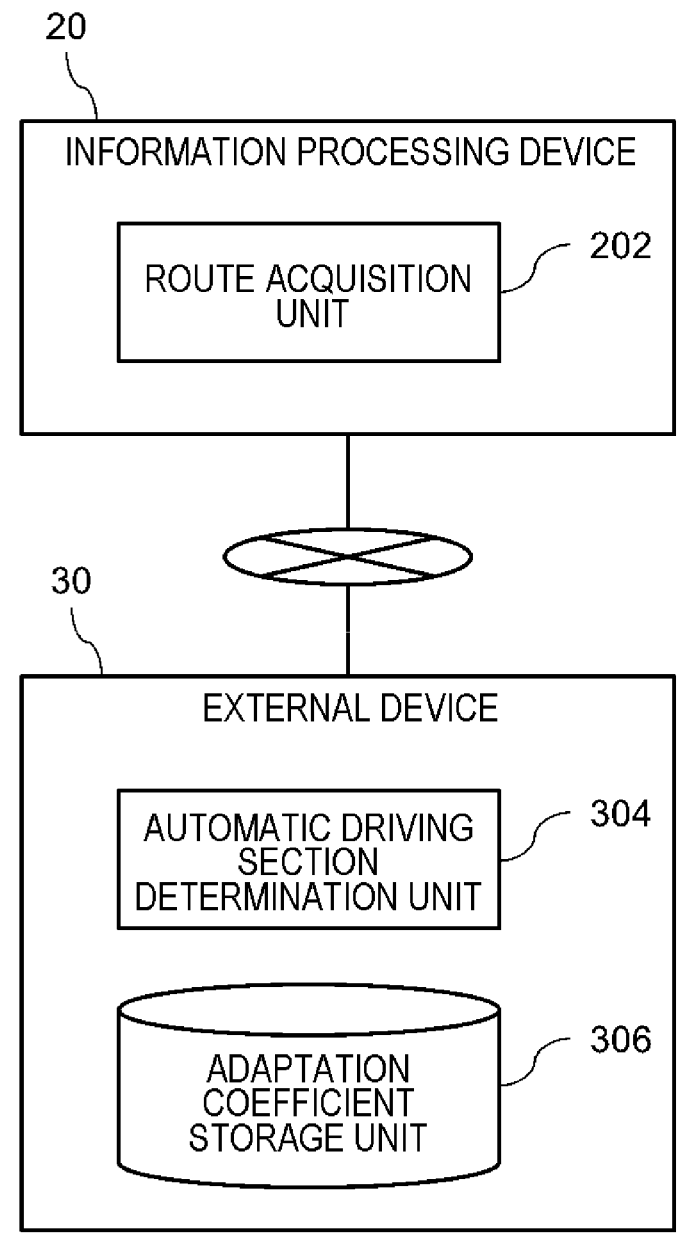
FIG. 8 is a block diagram conceptually showing a functional configuration of a second modification example in the first embodiment.

Further, a modification example having a configuration as shown in FIG. 8 can also be considered. FIG. 8 is a block diagram conceptually showing a functional configuration of a second modification example in the first embodiment. In the example of FIG. 8, the information processing device 20 does not include the automatic driving section determination unit 204 and the adaptation coefficient storage unit 206. Instead, the external device 30 includes an automatic driving section determination unit 304 and an adaptation coefficient storage unit 306. The automatic driving section determination unit 304 and the adaptation coefficient storage unit 306 are similar to the above-described automatic driving section determination unit 204 and adaptation coefficient storage unit 206.

In the present modification example, the route acquisition unit 202 is configured to be communicable with the external device 30 provided with the adaptation coefficient storage unit 306 through the external network of the vehicle such as an LTE circuit or 3G circuit. In this case, the destination information (for example, an internet protocol (IP) address or the like) of the external device 30 is registered in advance in a storage area (such as a memory or a storage device) of the information processing device 20. The route acquisition unit 202 communicates with the external device 30 using the destination information stored in the storage area, and transmits route information to the external device 30.

The automatic driving section determination unit 304 of the external device 30 reads out the adaptation coefficient of each section included in the moving route indicated by the route information from the adaptation coefficient storage unit 306, based on the route information received from the information processing device 20. Then, the automatic driving section determination unit 304 of the external device 30 determines the automatic driving section of the vehicle on which the information processing device 20 is mounted as described above, based on the read adaptation coefficient of each section. Then, the automatic driving section determination unit 304 of the external device 30 transmits information indicating the determined automatic driving section to the information processing device 20.

In this modification example, it is also possible to obtain the effect of the first embodiment. Further, according to the present embodiment, the computing capacity required for the information processing device 20 mounted on each vehicle can be suppressed, and the effect of reducing the manufacturing cost of the information processing device 20 can be expected.

Second Embodiment

The present embodiment has the same configuration as other embodiments, except for the following points.

[Functional Configuration]

Figure 9:
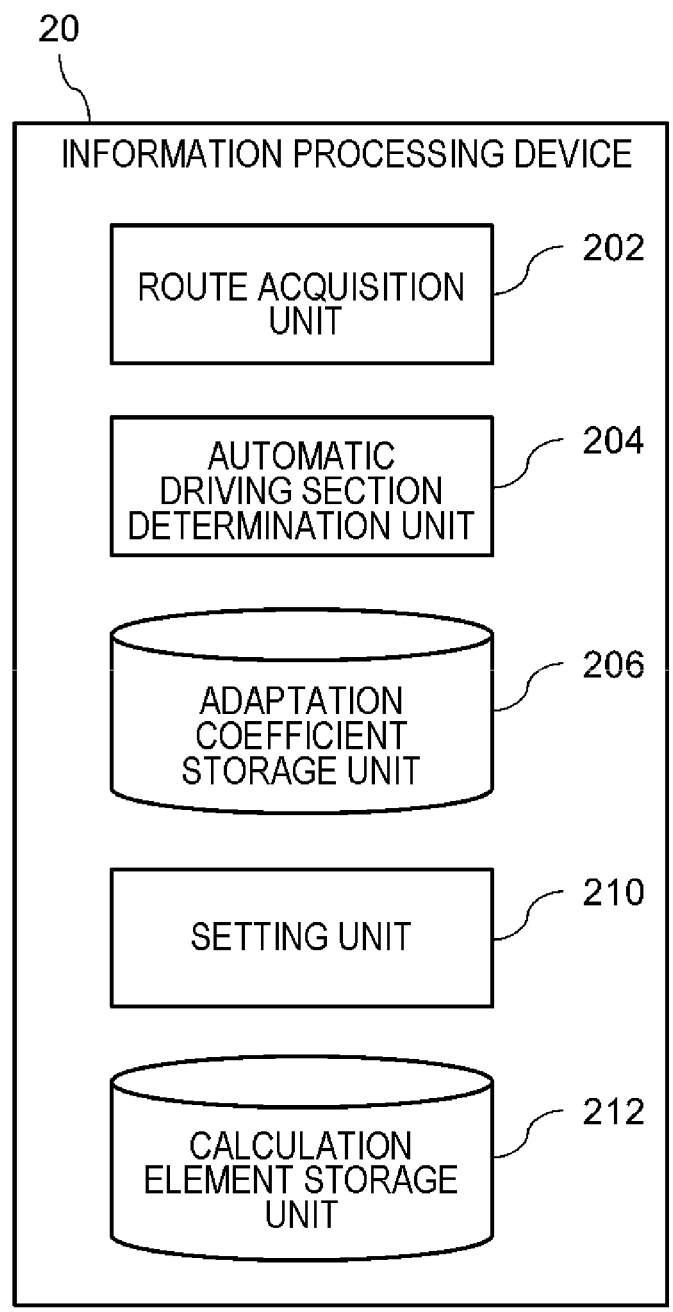
FIG. 9 is a block diagram conceptually showing a functional configuration of an information processing device in a second embodiment.

FIG. 9 is a block diagram conceptually showing a functional configuration of an information processing device 20 in the second embodiment. As shown in FIG. 9, the information processing device 20 of the present embodiment further includes a setting unit 210 in addition to the configuration of the first embodiment.

The setting unit 210 sets the adaptation coefficient for each section, based on an element for calculating the adaptation coefficient (hereinafter also referred to as "calculation element"). Here, the adaptation coefficient is a numerical value that can also be called an index of the degree of stability of automatic driving. The factor that affects the adaptation coefficient of automatic driving is set based on past data and future predictions, for example, a frequency at which the steering authority is transferred to the driver during automatic driving, a frequency of occurrence of communication with the outside of the vehicle (for example, pedestrians or other vehicles), accuracy of location estimation of the host vehicle or a vehicle having sensing functions equivalent to that of the host vehicle in a section, or the like is considered. Examples of the case of "the steering authority is transferred to the driver during automatic driving" include a case where the automatic driving system outputs a request to transfer the steering authority due to the limit of the system, a case where the driver's intentional override operation is performed, or the like. Examples of "communication with pedestrians or other vehicles" include communication of will to give way to pedestrians and other vehicles, communication of gratitude to pedestrians and drivers of other vehicles, or the like.

In the present embodiment, the calculation element used by the setting unit 210 includes at least one of (a) a frequency of occurrence of overrides occurring during automatic driving, (b) a frequency of occurrence of communication between the vehicle or the driver of the vehicle and the outside of the vehicle, (c) a frequency of occurrence of transfer of an authority from automatic driving to manual driving, and (d) a frequency at which the accuracy of vehicle location estimation is a predetermined threshold or less. The setting unit 210 may use various calculation elements that can directly or indirectly affect the adaptation coefficient of automatic driving, such as thunderstorm, fog, or west sun, as well as the calculation elements listed above.

Specifically, the setting unit 210 refers to the calculation element storage unit 212 that stores information related to a calculation element, and can calculate the adaptation coefficient of each section. The calculation element storage unit 212 stores the above-described calculation element in association with the information for identifying a section. Thereby, the setting unit 210 can calculate the adaptation coefficient for each section. For example, the higher the frequencies of (a) to (d) described above, the higher the possibility of requiring human intervention during automatic driving. Therefore, it can be said that the higher the frequencies of (a) to (d) described above, the lower the stability of the automatic driving. The setting unit 210 can calculate the adaptation coefficient of each section, using a predetermined function using the frequency of the above-described calculation element as a parameter, a table in which the frequency of the above-described calculation element is associated with the adaptation coefficient, or the like. Of the events shown by (a) to (d), a section where an event having a great impact on the driver occurs in a case where the event occurs is considered to be a section unsuitable for automatic driving even if the frequency of occurrence is not high. Therefore, the above function or table for calculating the adaptation coefficient may be set such that the adaptation coefficient is calculated to be lower as an event having the same frequency of occurrence has a greater influence on the driver.

In addition, in a case where the calculation element storage unit 212 further stores at least anyone of time information indicating time when the event corresponding to the calculation element occurs, weather information indicating the weather, vehicle type information indicating the vehicle type or the like of the vehicle where the event occurs, and sensor information indicating the type or the like of a sensor mounted on the vehicle where the event occurs, the setting unit 210 can divide and set the adaptation coefficient of each section, based on time information, weather information, vehicle type information, and sensor information. Here, the weather information includes information such as the wind direction and wind speed, the amount of precipitation, the amount of snowfall, the amount of snow accumulation when the event occurs. The vehicle type information also includes information such as the vehicle type and vehicle width of the vehicle in which the event has occurred. The sensor information also includes information such as the type and performance of a sensor mounted on the vehicle in which the event has occurred. For example, the setting unit 210 can set the adaptation coefficient of each section by time zone (morning, daytime, night, or the like), day of the week, season, weather, vehicle type, sensor, or the like, or a combination of at least a part thereof.

The calculation element storage unit 212 stores, for example, information as shown in FIG. 10. FIG. 10 is a diagram showing an example of information stored by the calculation element storage unit 212. The calculation element storage unit 212 stores information indicating the type of the event corresponding to the calculation element detected by each vehicle at least together with position information indicating the detected position of the event. The position information may be identification information uniquely assigned to each of the sections, or may be information of position coordinates that can be converted into sections. In the example of FIG. 10, the calculation element storage unit 212 stores information indicating the type of event corresponding to the calculation element detected by each vehicle in association with time information indicating the detection time of the event, weather information, vehicle type information, and sensor information. Note that FIG. 10 is merely an example, and the information stored by the calculation element storage unit 212 is not limited to the example of FIG. 10. For example, the types of calculation elements stored in the calculation element storage unit 212 may be further subdivided. As a specific example, the types of the calculation elements stored in the calculation element storage unit 212 may be classified based on the details of override (for example, crisis avoidance or user preference), the contents of communication (for example, transmission of intention to give way or transmission of intention of gratitude), the degree of decrease in position estimation accuracy (for example, low/medium/high), the cause of transfer of authority (main cause determined to be system limitation), or the like.

The information stored in the calculation element storage unit 212 is generated by a device mounted on a vehicle. For example, when a device mounted on a vehicle detects that an event corresponding to each calculation element has occurred, the device transmits information including at least the type of the event and the position at which the event is detected, to the server device. At this time, the device mounted on the vehicle may further add information indicating the time when the event is detected, the weather, the vehicle type of the host vehicle, and the sensor to the information to be transmitted to the server device. Thus, the information for the calculation element storage unit 212 is accumulated in the storage device provided in the server device or the storage device connected to the server device. In addition, the number of vehicles mounted with the apparatus having the above-described function may be one, but if a plurality of vehicles are mounted with the apparatus, it will become possible to collect easily the information over a wide range. Further, although the specific processing unit is not shown in the drawings, the information processing device 20 may have the above-described function.

In the configuration illustrated in FIG. 9, the information processing device 20 is provided with a calculation element storage unit 212. In this case, the information processing device 20 acquires information for the calculation element storage unit 212 accumulated by an external server device by, for example, push communication or pull communication, and can store the information in the calculation element storage unit 212 of the information processing device 20. At this time, in a case where information as shown in FIG. 10 is accumulated in the external server device as information for the calculation element storage unit 212, and in the information, there is information that does not match the vehicle type and sensor of the host vehicle on which the information processing device 20 is mounted, this information may not be acquired.

[Hardware Configuration]

The information processing device 20 of the present embodiment has a hardware configuration as shown in FIG. 4 as in the first embodiment. In the present embodiment, the storage device 108 further stores a program module for realizing the function of the setting unit 210. The processor 104 implements the function of the setting unit 210 by reading the program module into the memory 106 and executing it. The storage device 108 may further store, for example, information as shown in FIG. 10. In this case, the storage device 108 serves as the calculation element storage unit 212.

[Operation Example]

Figure 11:
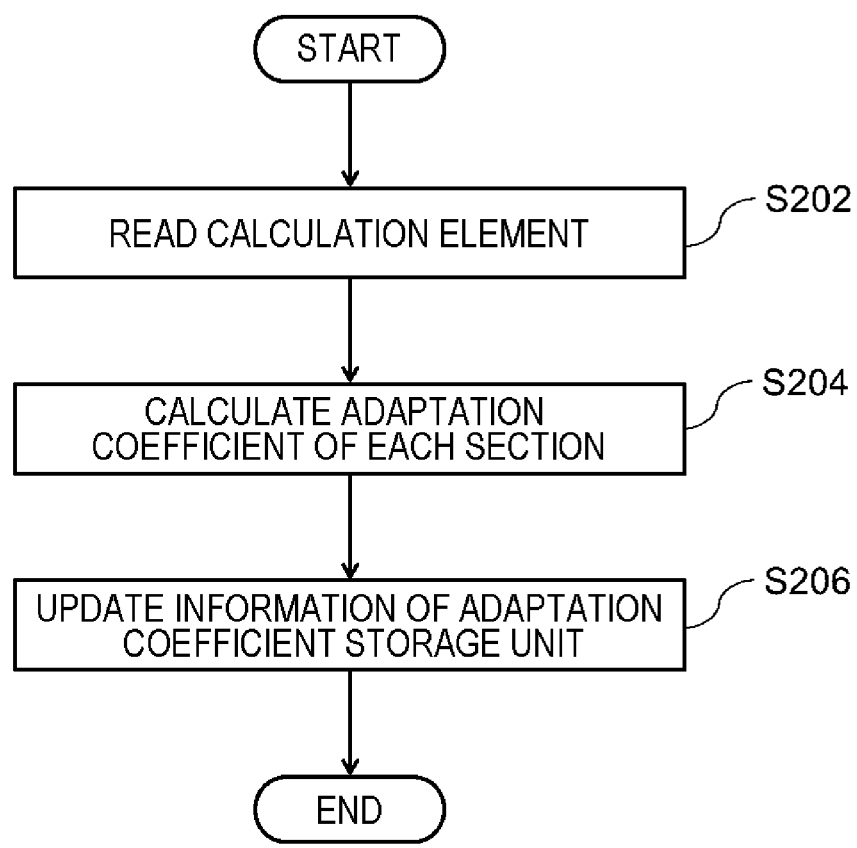
FIG. 11 is a flowchart illustrating the flow of a process in the second embodiment.

An example of the operation of the information processing device 20 of the present embodiment will be described, using FIG. 11. FIG. 11 is a flowchart illustrating the flow of a process in the second embodiment. The process described later is executed, for example, in response to a user's execution instruction. Further, the process described later may be executed according to a pre-scheduled timing (for example, at the time of engine startup, or the like).

The setting unit 210 reads the calculation element with reference to the calculation element storage unit 212 (S202).

At this time, among the information stored in the calculation element storage unit 212, only information that matches the vehicle type and sensor of the host vehicle on which the information processing device 20 is mounted is read as a calculation element. Further, only information similar to the current weather around the host vehicle may be read as a calculation element. Then, the setting unit 210 calculates the adaptation coefficient of each section, based on the read calculation element (S204). The setting unit 210 can determine which section the read calculation element corresponds to, based on the position information stored in association with each calculation element. The setting unit 210 can calculate a statistical value (for example, the frequency of each calculation element), based on the determined calculation element for each section. Then, the setting unit 210 can calculate the adaptation coefficient of each section, using a predetermined function that derives the adaptation coefficient using the statistical value as a parameter, a table in which the statistical value and the adaptation coefficient are associated, or the like. Then, the setting unit 210 updates the information stored in the calculation element storage unit 212, using the adaptation coefficient of each section calculated in S204 (S206).

As described above, in the present embodiment, the adaptation coefficient of each section is updated, based on information suitable for the current situation of the host vehicle, among the information on events affecting the adaptation coefficient of automatic driving collected from each vehicle during traveling. Thereby, the reliability of the adaptation coefficient of each section can be maintained. Further, in the present embodiment, it is possible to store the adaptation coefficients subdivided into time zones, days of the week, seasons, and the like in a predetermined storage unit, based on time information. Thus, it becomes possible to set an automatic driving section by a traveling time zone, day of the week, season, weather, vehicle type of the vehicle, sensor, or the like.

Modification Example

Figure 12:
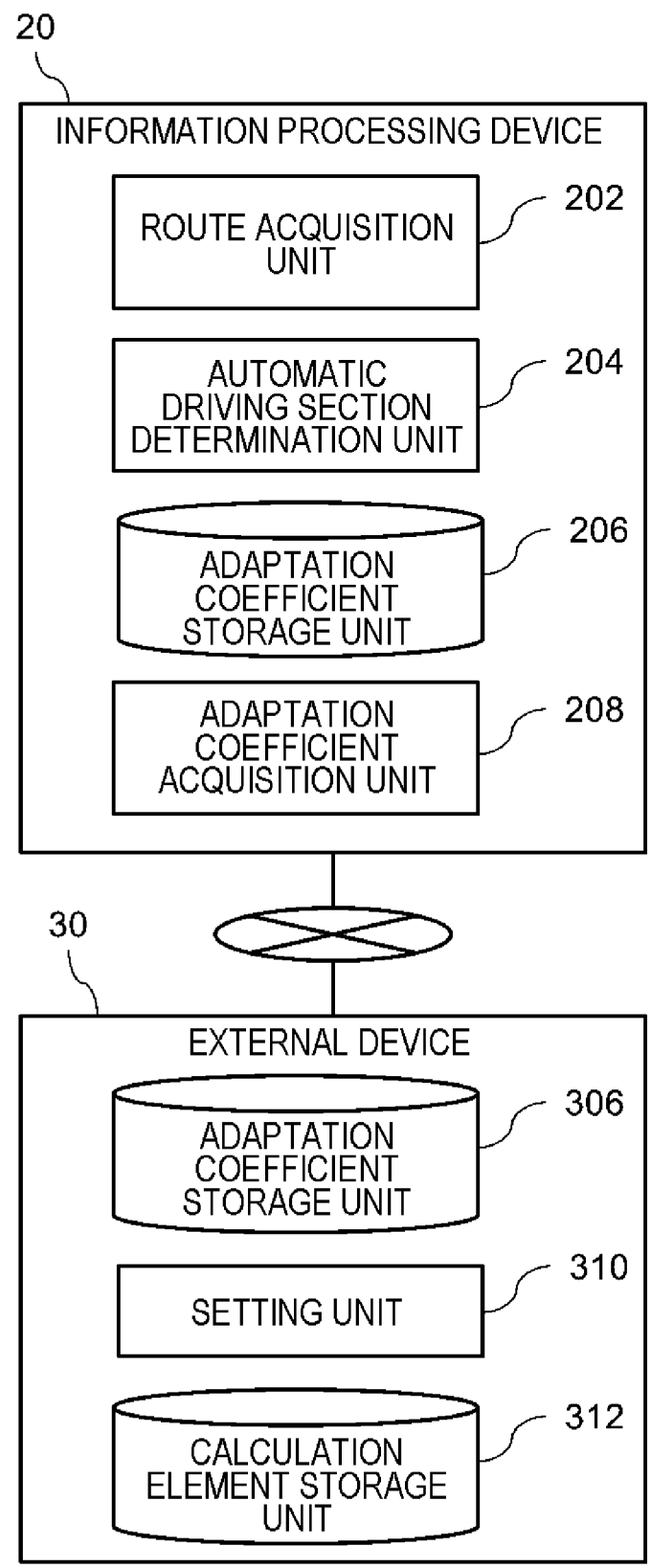
FIG. 12 is a block diagram conceptually showing a functional configuration of a modification example in the second embodiment.

FIG. 9 shows an example in which the information processing device 20 includes the setting unit 210, a configuration as shown in FIG. 12 can also be considered. FIG. 12 is a block diagram conceptually showing a functional configuration of a modification example in the second embodiment. In the example of FIG. 12, the information processing device 20 does not include the setting unit 210 and the calculation element storage unit 212. Instead, the external device 30 includes an adaptation coefficient storage unit 306, a setting unit 310, and a calculation element storage unit 312, and the information processing device 20 further includes the adaptation coefficient acquisition unit 208. The setting unit 310 and the calculation element storage unit 312 of the external device 30 are respectively similar to the setting unit 210 and the calculation element storage unit 212 described above. The adaptation coefficient storage unit 306 of the external device 30 stores the adaptation coefficient of each section, set by the setting unit 310 of the external device 30. The adaptation coefficient acquisition unit 208 of the information processing device 20 acquires the adaptation coefficient of each section set by the setting unit 310 in synchronization with the adaptation coefficient storage unit 306 of the external device 30, and can store the adaptation coefficient in the adaptation coefficient storage unit 206.

In this modification example, it is also possible to obtain the effect of the second embodiment.

Third Embodiment

The present embodiment has the same configuration as other embodiments, except for the following points. Although the following description will be made based on the configuration of the first embodiment, the information processing device 20 of the present embodiment may further include the configuration described in the second embodiment.

[Functional Configuration]

Figure 13:
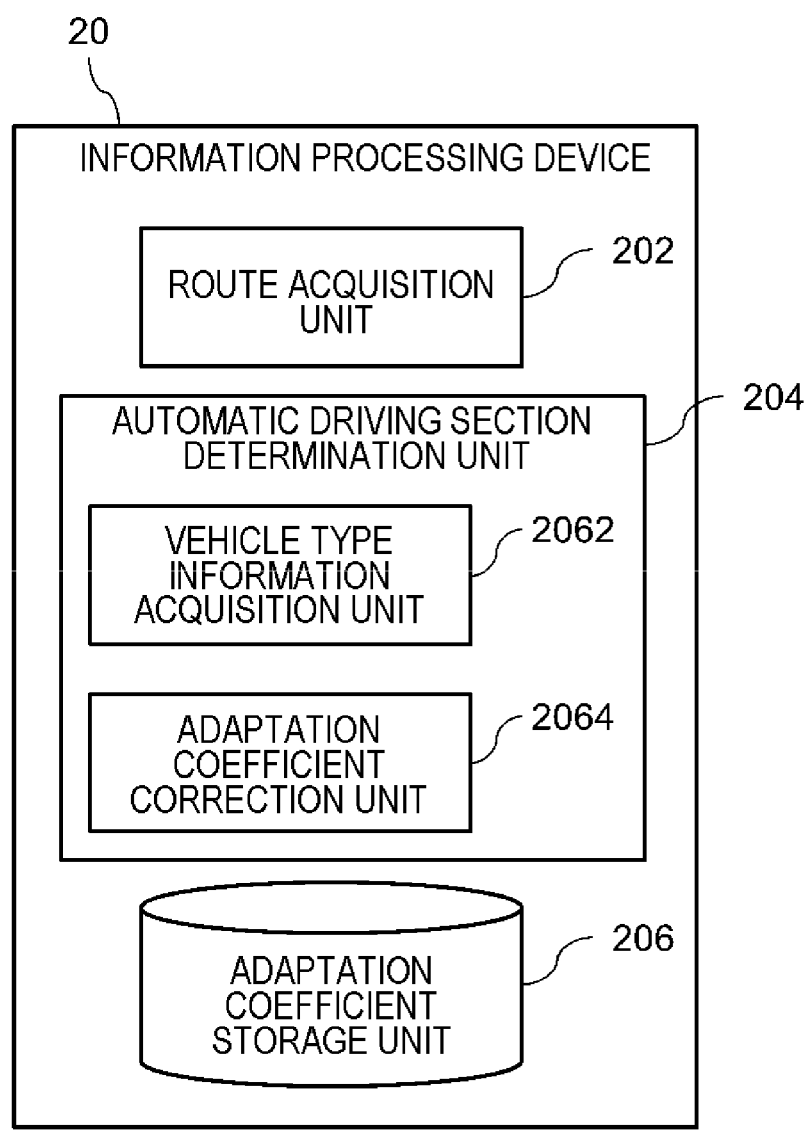
FIG. 13 is a block diagram conceptually showing a functional configuration of an information processing device in a third embodiment.

FIG. 13 is a block diagram conceptually showing a functional configuration of an information processing device 20 in a third embodiment. As shown in FIG. 13, the automatic driving section determination unit 204 of the present embodiment further includes a vehicle type information acquisition unit 2062 and an adaptation coefficient correction unit 2064.

The vehicle type information acquisition unit 2062 acquires information indicating the characteristics of the host vehicle. The characteristics of the vehicle include, for example, the size of an inner ring difference and an outer ring difference, the width of the sensing area of the mounted sensors, and the like. Specifically, the vehicle type information acquisition unit 2062 acquires information such as a vehicle type, a vehicle name, shape and size of a vehicle (for example, full length, full height, full width, wheelbase length, or the like), running performance (straight running stability, acceleration, rotational radius by travel speed, or the like). These pieces of information are registered in advance in, for example, the memory 106 or the storage device 108. In addition, the vehicle type information acquisition unit 2062 may be configured to acquire these pieces of information from the network through the network interface 112. In the latter case, information for searching for information indicating the characteristics of the host vehicle, such as the vehicle type and vehicle name of the host vehicle, is stored in advance in the memory 106 or the storage device 108. The vehicle type information acquisition unit 2062 can acquire information indicating the characteristics of the host vehicle from the network, using the information stored in the memory 106 and the storage device 108.

The adaptation coefficient correction unit 2064 corrects the adaptation coefficient, based on the information indicating the characteristics of the host vehicle. As a specific example, the adaptation coefficient correction unit 2064 acquires information indicating the width of the traveling lane in a section in the moving route, for example, from map data or the like, and in a case where the occupancy ratio of the vehicle with respect to the width of the traveling lane exceeds a predetermined threshold, the adaptation coefficient of the section can be lowered. Further, in this case, the adaptation coefficient correction unit 2064 may increase the decreasing value of the adaptation coefficient as the occupancy ratio increases. In addition, the adaptation coefficient correction unit 2064 acquires the curvature radius of a curve from map data or the like in the section including the curve, and can determine whether or not stable cornering is possible, based on the curvature radius of the curve and the rotational radius by speed of the vehicle. In this case, the adaptation coefficient correction unit 2064 uses a function or table for calculating an index value of cornering based on the curvature radius of the curve and the rotational radius by speed of the vehicle, and in a case where the index value falls below a reference value for determining stable cornering, it can lower the adaptation coefficient of the section. Further, in this case, the decrease value of the adaptation coefficient may increase as the difference between the index value and the reference value increases. In addition, the process of the adaptation coefficient correction unit 2064 illustrated here is merely an example, and the adaptation coefficient correction unit 2064 can perform processes other than this to correct the adaptation coefficient.

[Hardware Configuration]

The information processing device 20 of the present embodiment has a hardware configuration as shown in FIG. 4 as in the first embodiment. In the present embodiment, the storage device 108 further stores a program module for realizing the functions of the vehicle type information acquisition unit 2062 and the adaptation coefficient correction unit 2064. The processor 104 realizes the functions of the vehicle type information acquisition unit 2062 and the adaptation coefficient correction unit 2064 by reading the program modules into the memory 106 and executing it. In addition, the memory 106 or the storage device 108 according to the present embodiment stores information for searching for information indicating the characteristics of the host vehicle or information indicating the characteristics of the host vehicle.

[Operation Example]

Figure 14:
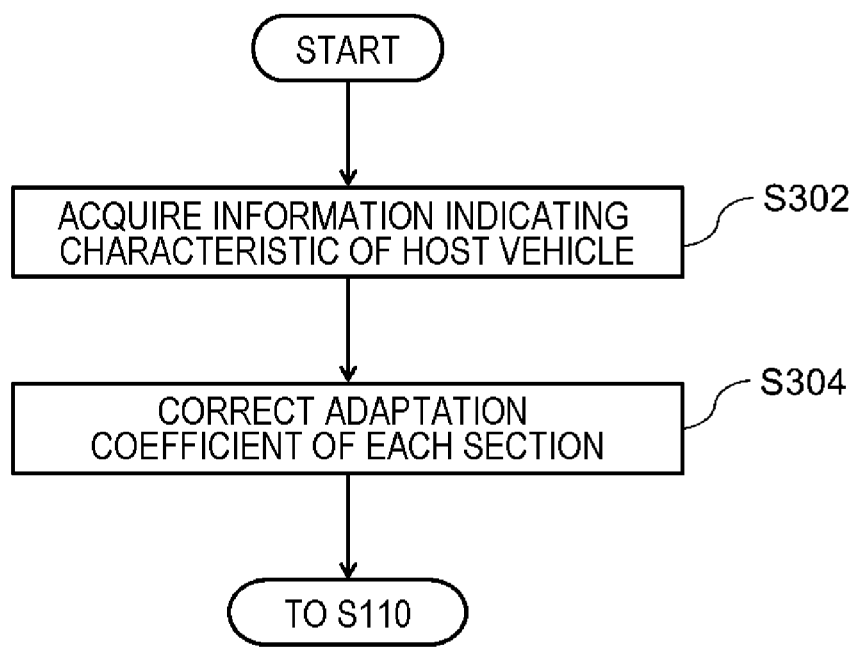
FIG. 14 is a flowchart illustrating the flow of a process in the third embodiment.

An example of the operation of the information processing device 20 of the present embodiment will be described, using FIG. 14. FIG. 14 is a flowchart illustrating the flow of a process in the third embodiment. The following processes are performed before S110 of FIG. 5.

First, the vehicle type information acquisition unit 2062 acquires information indicating the characteristics of the host vehicle (S302). In a case where the information indicating the characteristics of the host vehicle is stored in the memory 106 or the storage device 108, the vehicle type information acquisition unit 2062 reads the information from the memory 106 or the storage device 108. In addition, in a case where the memory 106 or the storage device 108 stores information for searching for information indicating the characteristics of the host vehicle, the vehicle type information acquisition unit 2062 reads out the information from the memory 106 or the storage device 108, and searches for and acquires information indicating the characteristics of the host vehicle over the network.

The adaptation coefficient correction unit 2064 corrects the adaptation coefficient of each section acquired in S108 of FIG. 5, based on the information indicating the characteristics of the host vehicle acquired in S302 (S304). For example, as described above, the adaptation coefficient correction unit 2064 can correct the adaptation coefficient of each section, based on the comparison result of the width of the traveling lane with the size of the host vehicle, and the comparison result of the curvature radius of the curve with the rotational radius of the host vehicle.

The adaptation coefficient storage unit 206 determines an automatic driving section in the moving route indicated by the route information selected in S104 of FIG. 5, based on the adaptation coefficient corrected by the adaptation coefficient correction unit 2064 (S110 in FIG. 5).

As described above, in the present embodiment, the adaptation coefficient for automatic driving set in each section is corrected according to the characteristics of the host vehicle (for example, the size, the traveling performance, or the like). Thereby, it becomes possible to determine an automatic driving section suitable for the host vehicle.

Fourth Embodiment

The present embodiment has the same configuration as other embodiments, except for the following points. Although the following description will be made based on the configuration of the first embodiment, the information processing device 20 of the present embodiment may further include the configuration described in the second or third embodiment.

[Functional Configuration]

Figure 15:
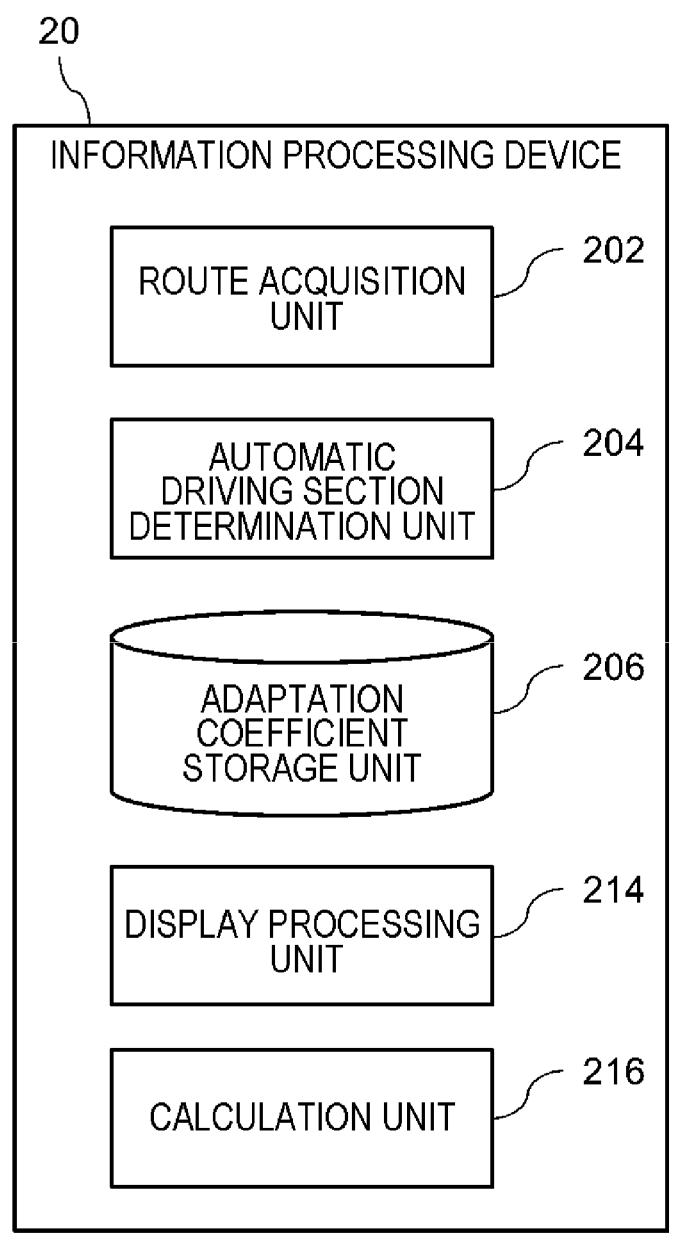
FIG. 15 is a block diagram conceptually showing a functional configuration of an information processing device in a fourth embodiment.

FIG. 15 is a block diagram conceptually showing a functional configuration of an information processing device 20 in a fourth embodiment. As shown in FIG. 15, the information processing device 20 of the present embodiment further includes a display processing unit 214 and a calculation unit 216, in addition to the configuration of the first embodiment.

The display processing unit 214 causes the display device 1104 to display the moving route of the vehicle. At this time, the display processing unit 214 causes the automatic driving section of the vehicle determined by the automatic driving section determination unit 204 to be displayed in a distinguishable state, on the moving route.

The calculation unit 216 calculates a statistical processing value obtained by statistically processing the adaptation coefficients of a plurality of sections included in the moving route indicated by the route information. The display processing unit 214 can cause the display device to display the statistical processing value of the moving route calculated by the calculation unit 216 together with the moving route.

[Hardware Configuration]

The information processing device 20 of the present embodiment has a hardware configuration as shown in FIG. 4 as in the first embodiment. In the present embodiment, the storage device 108 further stores program modules for realizing the functions of the display processing unit 214 and the calculation unit 216. The processor 104 realizes the functions of the display processing unit 214 and the calculation unit 216 by reading the program modules into the memory 106 and executing it.

[Operation Example]

Figure 16:
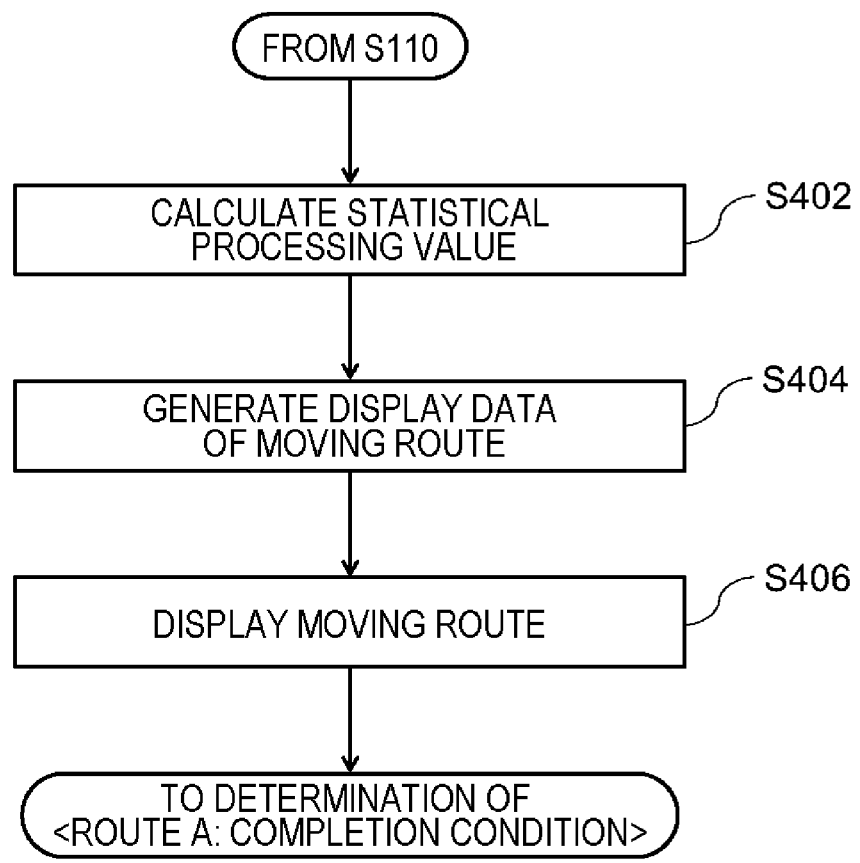
FIG. 16 is a flowchart illustrating the flow of a process in the fourth embodiment.

An example of the operation of the information processing device 20 of the present embodiment will be described, using FIG. 16. FIG. 16 is a flowchart illustrating the flow of a process in the fourth embodiment. The following processes are performed after S110 of FIG. 5.

The calculation unit 216 performs a statistical process on the adaptation coefficient of each section acquired in S108 of FIG. 5 to calculate a statistical processing value in the moving route including each section (S402). For example, the calculation unit 216 can calculate the total sum of the adaptation coefficients of the respective sections as a statistical processing value. The calculation unit 216 may calculate statistical processing values other than the total sum.

The display processing unit 214 generates display data of a moving route for which automatic driving sections are discriminable, using the route information acquired in S102 of FIG. 5 and the information indicating the automatic driving section determined in S110 of FIG. 5 (S404). At this time, the display processing unit 214 can generate display data for displaying the statistical processing value calculated in step S402 together with the moving route.

Figure 17:
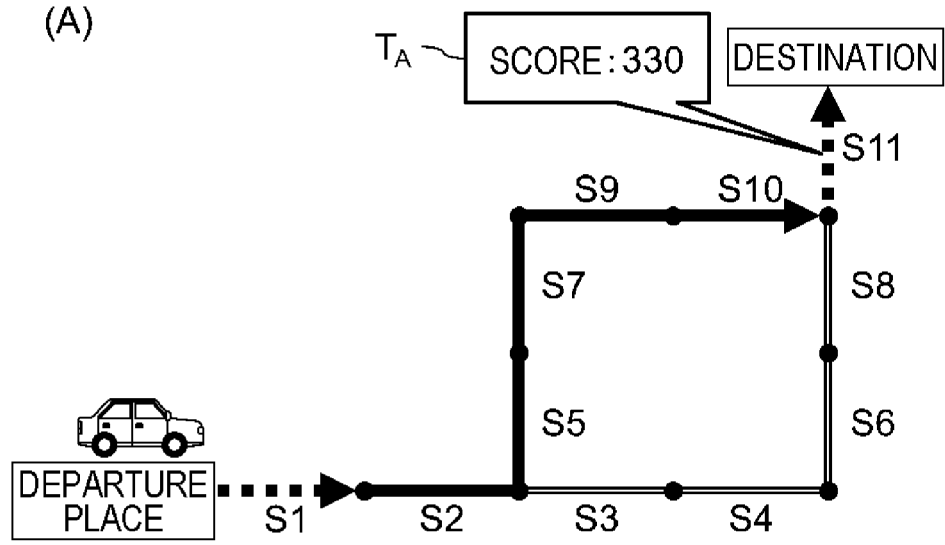
FIGS. 17(A) and 17(B) are diagrams showing an example of information displayed on a display device by a display processing unit of the fourth embodiment.
Figure 17:
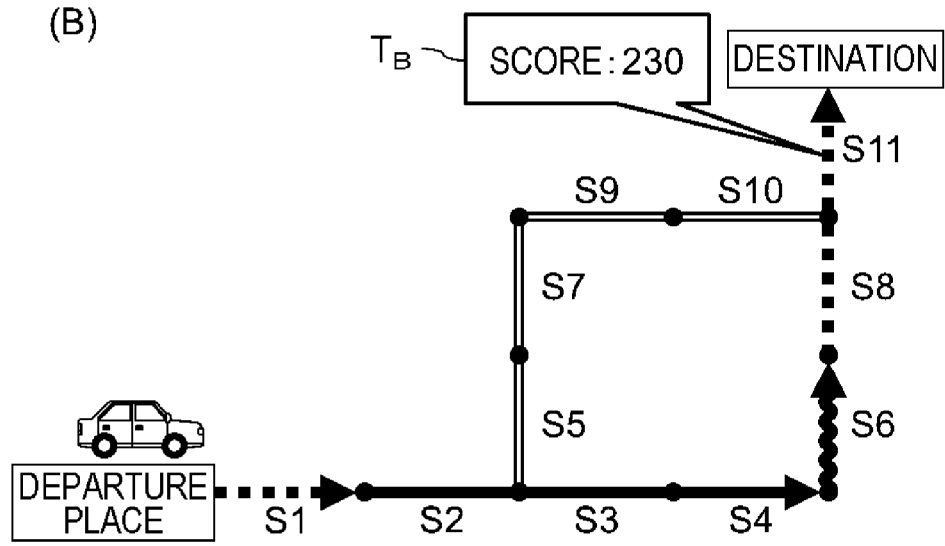

Then, the display processing unit 214 causes the display device 1104 or the like to display the display data generated in S404 (S406). An example of display by the display processing unit 214 is shown in FIG. 17. FIG. 17 is a diagram showing an example of information displayed on the display device 1104 by the display processing unit 214 of the fourth embodiment. A display example of information on the route A is shown in (A) of FIG. 17. Further, a display example of information on the route B is shown in (B) of FIG. 17. In the present example, the solid line indicates the "automatic driving section" described in the first embodiment. Further, in the present example, a dotted line indicates the "manual driving section" described in the first embodiment. Further, in the present example, a broken line indicates the "quasi-automatic driving section" described in the first embodiment.

The display processing unit 214 can display the statistical processing value calculated by the calculation unit 216 together with the moving route, as shown by reference symbols $T_A$, $T_B$ in FIG. 17. Although FIG. 17 illustrates an example in which the calculation unit 216 calculates the total sum of the adaptation coefficients as the statistical processing value, the calculation unit 216 may calculate statistical processing values other than the total sum. In addition, the display processing unit 214 may convert the statistical processing value calculated by the calculation unit 216 into another index (for example, a recommendation degree corresponding to the statistical processing value) and display it. Further, in this case, the display processing unit 214 may change the display color or the like of the moving route according to the index.

Further, when displaying the moving route, the display processing unit 214 changes the display mode according to the adaptation coefficient (or the adaptation coefficient after correction) set for each section included in the moving route. Specifically, in the display of the moving route, the display processing unit 214 may change the color or shape of the display portion corresponding to each section according to the adaptation coefficient (degree of adaptation) of each section. As a specific example, in the case of using a change in color, the display processing unit 214 can express the height of the adaptation coefficient by the shade of color. In addition, the display processing unit 214 can express the height of the adaptation coefficient by changing the hue between the first color (for example, red) and the second color (for example, blue). Further, without being limited to these examples, the display processing unit 214 can perform display such that the difference in the adaptation coefficient of each section can be recognized. Alternatively, the color or shape of the display portion corresponding to each section may be changed for each of the automatic driving section, the quasi-automatic driving section, the manual driving section, and the like determined based on the adaptation coefficient. Alternatively, the point of occurrence of the event (override, transfer of authority, or the like) corresponding to the calculation element that is the basis of calculation of the adaptation coefficient of each section may be superimposed and displayed on the map data in a display mode that can identify the type of the event. Thus, the user who has checked the moving route can easily recognize the degree of adaptation of each section to the automatic driving.

As described above, according to the present embodiment, it is possible for the driver to recognize at a glance the automatic driving section in the moving route. Further, in the present embodiment, together with the moving route, a statistical processing value obtained by statistically processing the adaptation coefficient of the section included in the moving route is displayed. This makes it easier for the driver to recognize the route that suits the driver's preference.

Fifth Embodiment

The present embodiment has the same configuration as the fourth embodiment, except for the following points.

[Functional Configuration]

Figure 18:
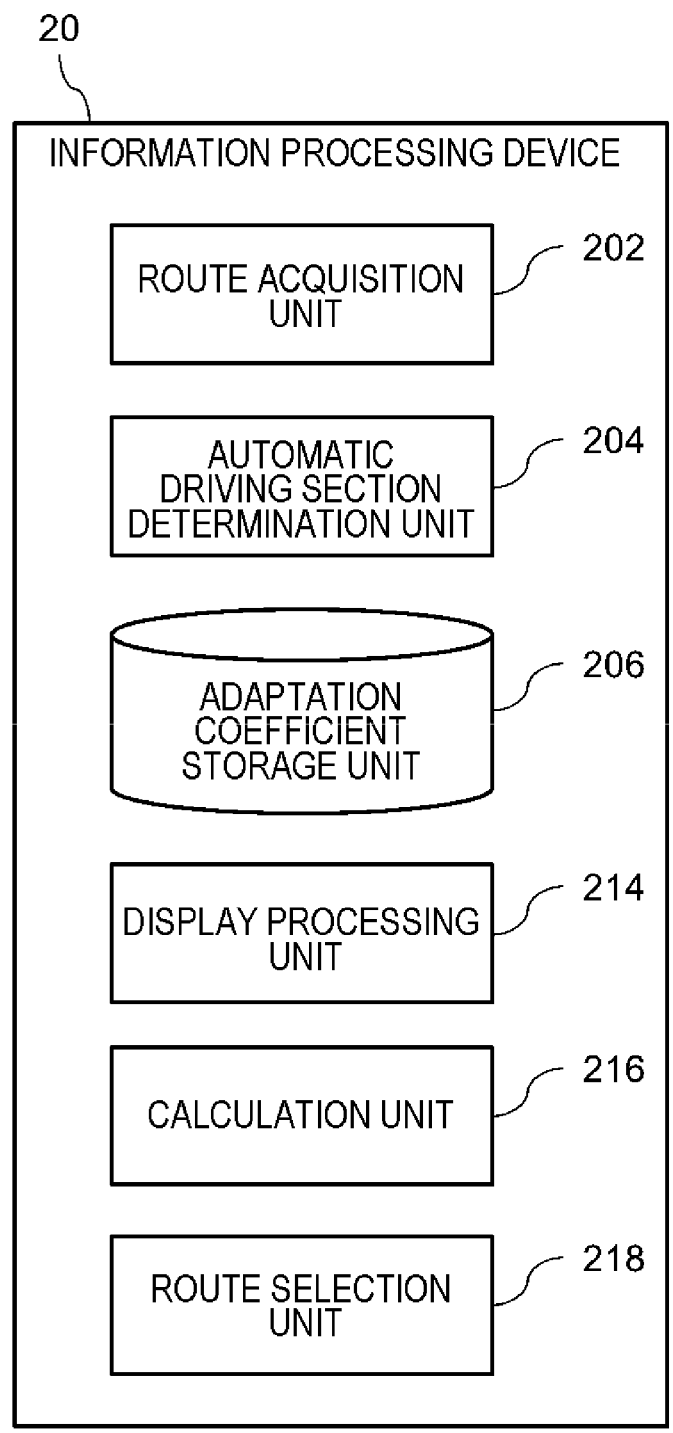
FIG. 18 is a block diagram conceptually showing a functional configuration of an information processing device in a fifth embodiment.

FIG. 18 is a block diagram conceptually showing a functional configuration of an information processing device 20 in a fifth embodiment. As shown in FIG. 18, the information processing device 20 of the present embodiment further includes a route selection unit 218 in addition to the configuration of the fourth embodiment.

In a case where a plurality of moving routes are obtained by the route acquisition unit 202, the route selection unit 218 selects one of the plurality of moving routes, based on the statistical processing value of each of the plurality of moving routes calculated by the calculation unit 216.

[Hardware Configuration]

The information processing device 20 of the present embodiment has a hardware configuration as shown in FIG. 4. In the present embodiment, the storage device 108 further stores a program module for realizing the function of the route selection unit 218. The processor 104 implements the function of the route selection unit 218 by reading the program modules into the memory 106 and executing it.

[Operation Example]

Figure 19:
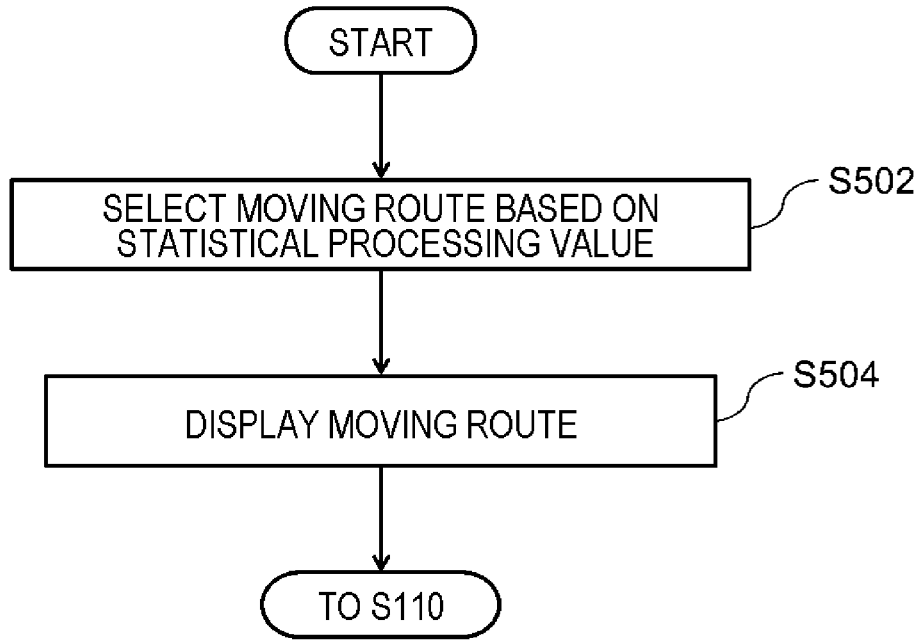
FIG. 19 is a flowchart illustrating the flow of a process in the fifth embodiment.

An example of the operation of the information processing device 20 of the present embodiment will be described, using FIG. 19. FIG. 19 is a flowchart illustrating the flow of a process in the fifth embodiment. The following process is performed after the calculation unit 216 calculates statistical processing values for all routes acquired by the route acquisition unit 202.

First, the route selection unit 218 compares the statistical processing values calculated for the plurality of moving routes, and selects one moving route from among the plurality of moving routes (S502). For example, in a case where the statistical processing value is the total sum of the adaptation coefficients, the route selection unit 218 can select the moving route with the largest sum.

Figure 20:
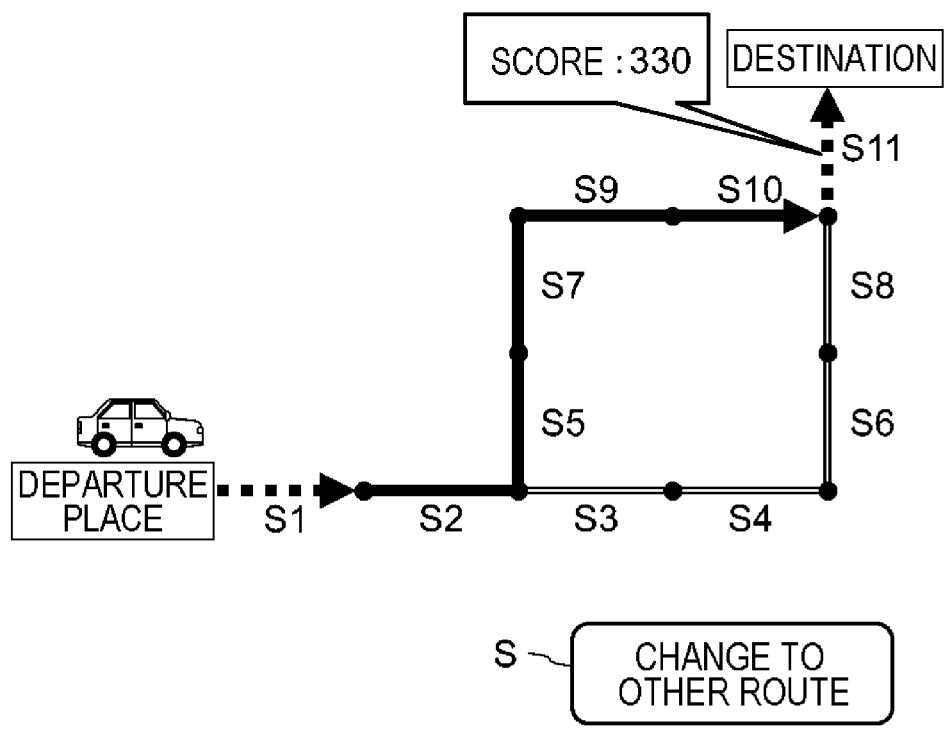
FIG. 20 is a diagram showing an example of information displayed on a display device by a display processing unit of the fifth embodiment.

Then, the display processing unit 214 preferentially displays the moving route selected by the route selection unit 218 (S504). Here, "preferentially display" means, for example, to display only the moving route selected in S502 to be superimposed on the map data, or to display the moving route selected in S502 to be distinguishable from other moving routes (for example, color change, or the like). In the former case, the display processing unit 214 may display a screen as shown in FIG. 20, for example. FIG. 20 is a diagram showing an example of information displayed on the display device 1104 by the display processing unit 214 of the fifth embodiment. The display processing unit 214 can display a screen including a screen element (symbol S in FIG. 20) capable of selecting another moving route such that the moving route can be switched to another moving route different from the moving route currently displayed on the screen.

As described above, in the present embodiment, one moving route is selected, based on the statistical processing value obtained by statistically processing the adaptation coefficient of each section included in the moving route. Thus, the driver can immediately know the moving route suitable for automatic driving among a plurality of moving routes to the destination.

Sixth Embodiment

The present embodiment has the same configuration as other embodiments, except for the following points. Although the following description will be made based on the configuration of the first embodiment, the information processing device 20 of the present embodiment may further include the configuration described in the second to fifth embodiment.

[Functional Configuration]

Figure 21:
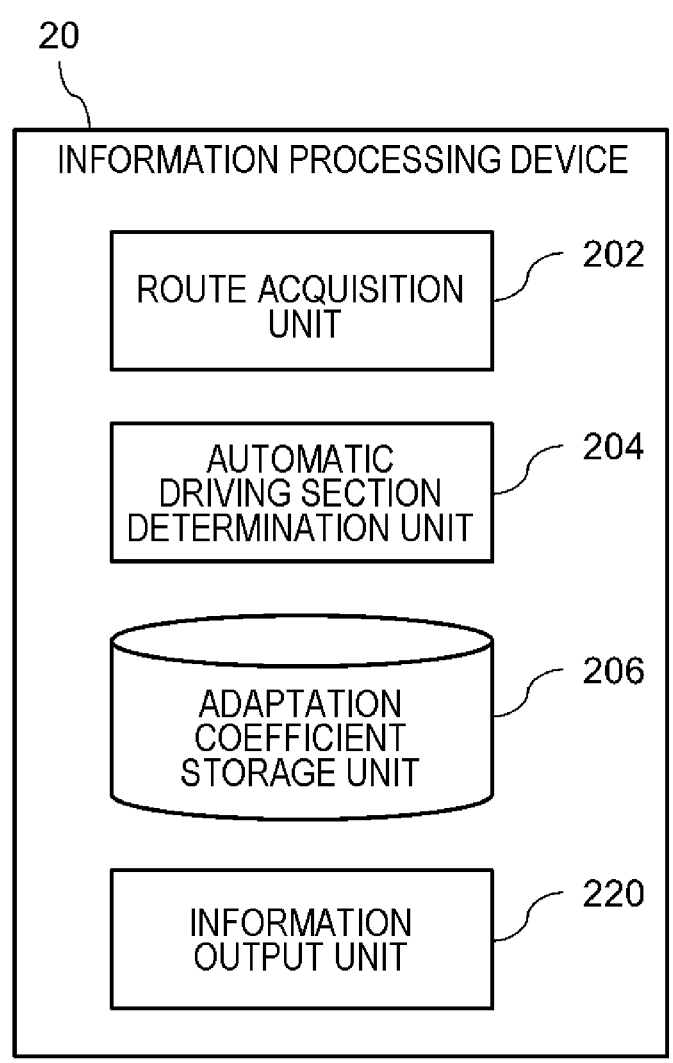
FIG. 21 is a block diagram conceptually showing a functional configuration of an information processing device in a sixth embodiment.

FIG. 21 is a block diagram conceptually showing a functional configuration of an information processing device 20 in a sixth embodiment. As shown in FIG. 21, the information processing device 20 of the present embodiment further includes an information output unit 220 in addition to the configuration of the first embodiment.

The information output unit 220 controls the information to be output in the vehicle, based on the adaptation coefficient set for each section included in the moving route, while the vehicle is traveling on the moving route. Here, the driver may have to steer the section where the adaptation coefficient is low. Therefore, although not particularly limited, in a case where the vehicle approaches a position within a predetermined distance from a point where the adaptation coefficient set for each section included in the moving route is the reference or less, it is preferable that the information output unit 220 is configured to output a message.

As a specific example, a case is considered in which a vehicle approaches a predetermined distance from a quasi-automatic driving section (a section where the adaptation coefficient is "35" or more and less than "50") while traveling in an automatic driving section (a section where the adaptation coefficient is "50" or more) or a manual driving section (a section where the adaptation coefficient is less than "35"). In addition, the information output unit 220 can determine whether the vehicle has approached within a predetermined distance from the section, for example, based on a distance between two points (a linear distance or a distance on a route) calculated from position information of the start point of each section and position information of the host vehicle estimated in the host vehicle position estimation process. In a case where a vehicle approaches a predetermined distance from a section where the adaptation coefficient is "35" or more and less than "50" while traveling in an automatic driving section where the adaptation coefficient is "50" or more, or a manual driving section where the adaptation coefficient is less than "35", the information output unit 220 can output a message such as "Soon, it is a quasi-automatic driving section" to the display device 1104 or a speaker device (not shown). At this time, the reason why the next section is the quasi-automatic driving section may be specified based on the frequency of the calculation element that is the basis of the calculation of the adaptation coefficient of the section, and may be output together with the above message. That is, the information output unit 220 adds and outputs a message such as, for example, "a section where the frequency of occurrence of override is high." Thus, the driver can recognize in advance the contents to be noted in the same section. Further, in a case of approaching the "automatic driving section from the "manual driving section" or the "quasi-automatic driving section", or in a case of approaching the "manual driving section" from the "automatic driving section" or the "quasi-automatic driving section", the information output unit 220 can similarly output a predetermined message.

[Hardware Configuration]

Figure 22:
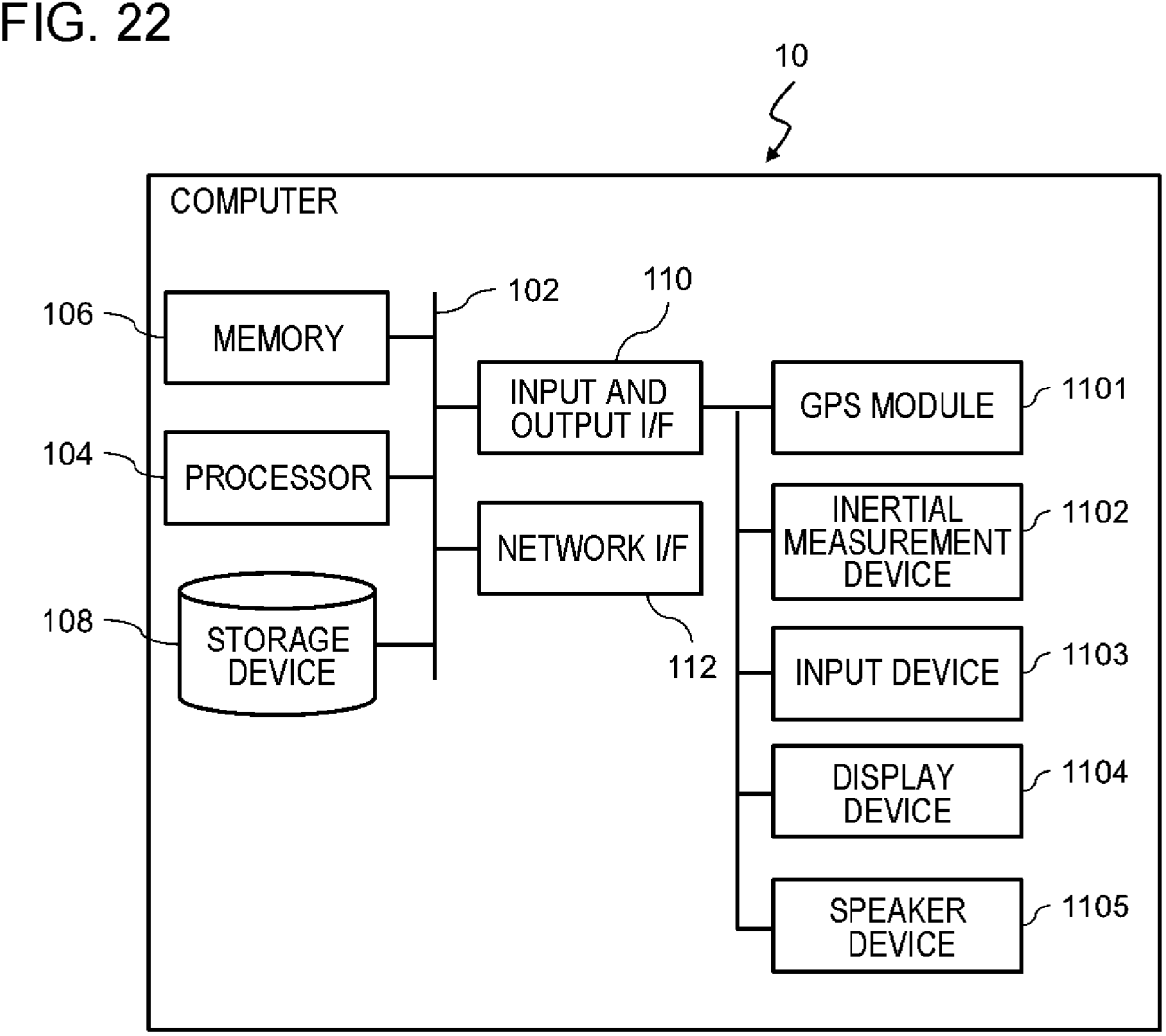
FIG. 22 is a diagram illustrating a hardware configuration of the information processing device.

The information processing device 20 of the present embodiment is realized by a computer 10 as shown in FIG. 22. In addition to the configuration of the computer 10 shown in FIG. 4, the computer 10 shown in FIG. 22 has a speaker device 1105 that outputs a predetermined message according to an audio output instruction from the information output unit 220. In the present embodiment, the storage device 108 further stores program modules for realizing the function of the information output unit 220. The processor 104 implements the function of the information output unit 220 by reading the program modules into the memory 106 and executing it. Further, the information output unit 220 may be configured to output a predetermined message from an on-vehicle speaker (not shown) connected through, for example, the input and output interface 110 or the network interface 112. In this case, the speaker device 1105 may be omitted.

[Operation Example]

Figure 23:
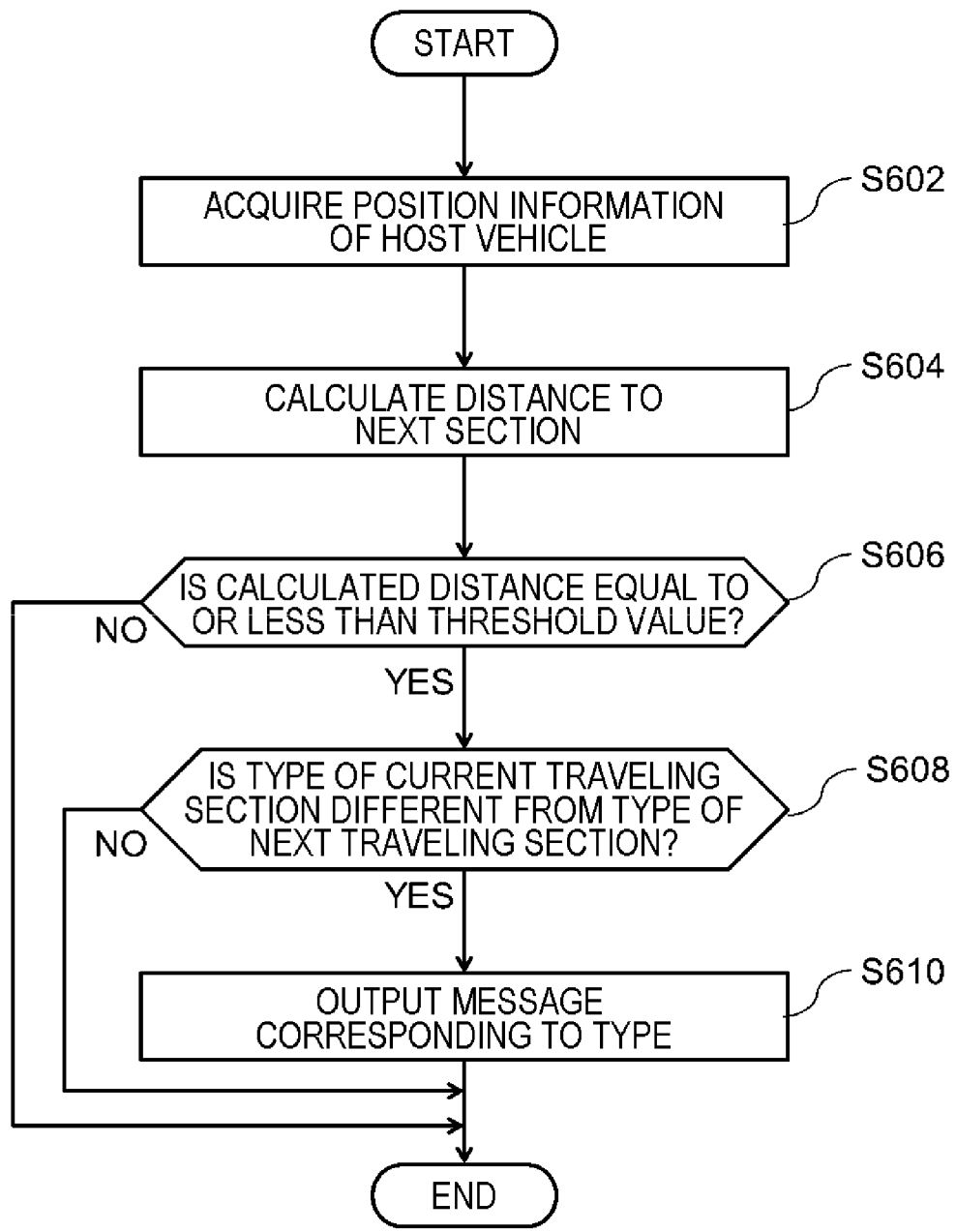
FIG. 23 is a flowchart illustrating the flow of a process in the sixth embodiment.

An example of the operation of the information processing device 20 of the present embodiment will be described, using FIG. 23. FIG. 23 is a flowchart illustrating the flow of a process in the sixth embodiment.

First, the information output unit 220 acquires the position information of the host vehicle (S602). The information output unit 220 is configured to be capable of estimating the position information of the host vehicle using a self-position estimation method using, for example, a Kalman filter or a particle filter. Further, it may be configured to be capable of acquiring position information of the host vehicle from another processing unit (not shown).

The information output unit 220 compares the position information of the starting point of the next traveling section of the section in which the vehicle is currently traveling with the position information of the host vehicle acquired in S602 to calculate the distance to the next section (S604). In addition, the information indicating the section in which the vehicle is currently traveling is stored in the memory 106 or the like, for example. The initial value of the information is a section of the departure point of the moving route, and is updated based on the position information of the host vehicle.

Then, the information output unit 220 determines whether the distance calculated in S604 is a predetermined threshold or less (S606). The threshold is stored in advance in the memory 106 or the like. In a case where the distance calculated in S604 is the predetermined threshold or less (YES in S606), it is further determined whether the type of the next traveling section is different from the type of the current traveling section (S608).

In a case where the type of the next traveling section is different from the type of the current traveling section (YES in S608), the information output unit 220 outputs a message corresponding to the type of the next traveling section to the display device 1104 or the speaker device 1105 (S610). This message is stored as a text file or an audio file in the storage device 108 or the like in association with information identifying the type of the section.

Incidentally, in a case where the determination in S606 or S608 is NO, the information output unit 220 ends the process without outputting a predetermined message.

As described above, according to the present embodiment, it is possible to notify the driver of information on the next section by the output message. The driver can take appropriate action based on the message.

Although the example embodiments of the present invention have been described with reference to the drawings, these are examples of the present invention, and it is possible to adopt a combination of the above respective example embodiments, or various other configurations.

This application claims priority based on Japanese Patent Application No. 2017-016008 filed on Jan. 31, 2017, and the disclosure of which is incorporated herein in its entirety.

The invention claimed is:
1. An information processing device comprising:
   at least one memory storing instructions; and
   at least one processor coupled to the at least one memory, the at least one processor being configured to execute the instructions to:
   acquire route information indicating a moving route of a mobile body, the moving route comprising a plurality of sections;
   obtain, from a storage, an adaption coefficient of automatic driving for each section of the plurality of sections of the moving route indicated by the route information, the storage storing the adaptation coefficient of automatic driving set for each section and indicating whether or not stable automatic driving is possible for each section;
   determine one or more sections of the moving route are automatic driving sections of the mobile body, based on the adaptation coefficients of the plurality of the sections included in the moving route; and
   for each section determined to be an automatic driving section, provide an output for performing automatic driving of the mobile body while the mobile body is traveling in each automatic driving section,
   wherein the at least one processor is further configured to execute the instructions to set the adaptation coefficients, based on a calculation element including at least any one of a frequency of occurrence of overrides occurring during automatic driving, a frequency of occurrence of communication between the mobile body or a driver of the mobile body and an outside of the mobile body, a frequency of occurrence of transfer of authority from automatic driving to manual driving, and a frequency at which an accuracy of location estimation of the mobile body is a predetermined threshold or less.

2. The information processing device according to claim 1,
   wherein the calculation element is associated with information, the information including at least one of time information, weather information, vehicle type information, and sensor information, and
   wherein the at least one processor is further configured to execute the instruction to set the adaptation coefficient for each classification based on the information.

3. The information processing device according to claim 1,
   wherein the at least one processor is further configured to execute the instructions to communicate with an external device provided with the storage through an external network of the mobile body and acquire the adaptation coefficient.

4. The information processing device according to claim 1
   wherein the storage is further provided.

5. The information processing device according to claim 1,
   wherein the at least one processor is further configured to execute the instructions to correct the adaptation coefficient, based on information for specifying characteristics of the mobile body.

6. The information processing device according to claim 1,
   wherein the at least one processor is further configured to execute the instructions to display the moving route on a display device in a state in which the automatic driving section of the mobile body is identifiable.

7. The information processing device according to claim 6,
   wherein the at least one processor is further configured to execute the instructions to change a display mode of each section, based on the adaptation coefficient that is set for each section included in the automatic driving section, in display of the moving route.

8. The information processing device according to claim 6, wherein the at least one processor is further configured to execute the instructions to:
   calculate a statistical processing value obtained by statistically processing the adaptation coefficients of a plurality of sections included in the moving route indicated by the route information, and
   cause the display device to display the statistical processing value of the moving route, together with the moving route.

9. The information processing device according to claim 8, wherien the at least one processor is further configured to execute the instructions to:
   in a case where a plurality of the moving routes are obtained, select one of the plurality of moving routes, based on the statistical processing value of each of the plurality of moving routes.

10. The information processing device according to claim 1,
    wherein the at least one processor is further configured to execute the instructions to control information to be output in the mobile body, based on the adaptation coefficient set for each section included in the moving route, while traveling on the moving route.

11. The information processing device according to claim 10,
    wherein the at least one processor is further configured to execute the instructions to output a predetermined message, in a case where the mobile body approaches a position within a predetermined distance from a point where the adaptation coefficient set for each section included in the moving route is a reference value or less.

12. The information processing device according to claim 11,
    wherein the at least one processor is further configured to execute the instructions to output information on contents to be noted in a section following the point, together with the predetermined message.

13. An information processing method, executed by a computer, comprising:
    a step of acquiring route information indicating a moving route of a mobile body, the moving route comprising a plurality of sections;
    a step of obtaining, from a storage, an adaption coefficient of automatic driving for each section of the plurality of sections of the moving route indicated by the route information, the storage storing the adaptation coefficient of automatic driving set for each section and indicating whether or not stable automatic driving is possible for each section;
    a step of determining one or more sections of the moving route are automatic driving sections of the mobile body, based on the adaptation coefficients of the plurality of the sections included in the moving route; and
    for each section determined to be an automatic driving section, a step of providing an output for performing automatic driving of the mobile body while the mobile body is traveling in each automatic driving section, wherein the adaptation coefficients are set based on a calculation element including at least any one of a frequency of occurrence of overrides occurring during automatic driving, a frequency of occurrence of communication between the mobile body or a driver of the mobile body and an outside of the mobile body, a frequency of occurrence of transfer of authority from automatic driving to manual driving, and a frequency at which an accuracy of location estimation of the mobile body is a predetermined threshold or less.

14. A non-transitory computer readable medium storing a program causing a computer to:

acquire route information indicating a moving route of a mobile body, the moving route comprising a plurality of sections;

obtain, from a storage, an adaption coefficient of automatic driving for each section of the plurality of sections of the moving route indicated by the route information, the storage storing the adaptation coefficient of automatic driving set for each section and indicating whether or not stable automatic driving is possible for each section;

determine one or more sections of the moving route are automatic driving sections of the mobile body, based on the adaptation coefficients of the plurality of the sections included in the moving route; and for each section determined to be an automatic driving section, provide an output for performing automatic driving of the mobile body while the mobile body is traveling in each automatic driving section, wherein the adaptation coefficients are set based on a calculation element including at least any one of a frequency of occurrence of overrides occurring during automatic driving, a frequency of occurrence of communication between the mobile body or a driver of the mobile body and an outside of the mobile body, a frequency of occurrence of transfer of authority from automatic driving to manual driving, and a frequency at which an accuracy of location estimation of the mobile body is a predetermined threshold or less.

* * * * *